United States Patent
Vesma et al.

(10) Patent No.: US 7,454,683 B2
(45) Date of Patent: Nov. 18, 2008

(54) BURST TRANSMISSION

(75) Inventors: Jussi Vesma, Turku (FI); Harri Pekonen, Raisio (FI)

(73) Assignee: Nokia Corporation, Espoo (FI)

( * ) Notice: Subject to any disclaimer, the term of this patent is extended or adjusted under 35 U.S.C. 154(b) by 96 days.

(21) Appl. No.: 10/574,241

(22) PCT Filed: Sep. 23, 2004

(86) PCT No.: PCT/IB2004/051837

§ 371 (c)(1),
(2), (4) Date: Jan. 9, 2007

(87) PCT Pub. No.: WO2005/032034

PCT Pub. Date: Apr. 7, 2005

(65) Prior Publication Data

US 2007/0101228 A1    May 3, 2007

(30) Foreign Application Priority Data

Sep. 29, 2003    (GB)    ................... 0322777.4

(51) Int. Cl.
*H03M 13/00*    (2006.01)
(52) U.S. Cl. .................................................... 714/752
(58) Field of Classification Search ......... 714/751–752, 714/786
See application file for complete search history.

(56) References Cited

U.S. PATENT DOCUMENTS

| 6,209,116 | B1 * | 3/2001 | Hammons et al. ............ 714/786 |
| 6,430,721 | B2 * | 8/2002 | Kajala et al. ................. 714/752 |
| 6,556,588 | B2 | 4/2003 | Wan et al. .................... 370/474 |
| 6,823,470 | B2 | 11/2004 | Smith et al. ..................... 714/4 |
| 6,868,520 | B1 * | 3/2005 | Fauconnier ................. 714/790 |

FOREIGN PATENT DOCUMENTS

| EP | 1 071 221 A1 | 1/2001 |
| EP | 1 306 997 A1 | 5/2003 |
| GB | 2 399 719 | 9/2004 |
| WO | 00/70457 | 11/2000 |
| WO | 2004/079956 | 9/2004 |
| WO | 2004/079982 | 9/2004 |

\* cited by examiner

*Primary Examiner*—Shelly A Chase

(57) ABSTRACT

A terrestrial digital video broadcasting (DVB-T) network is used to transmit IP datagrams to receiving devices using multiprotocol encapsulation (MPE). MPE datagram sections and forward error correction (FEC) datagram sections are transmitted in separate time-sliced bursts using transport stream packets with different packet identifiers (PIDs).

27 Claims, 13 Drawing Sheets

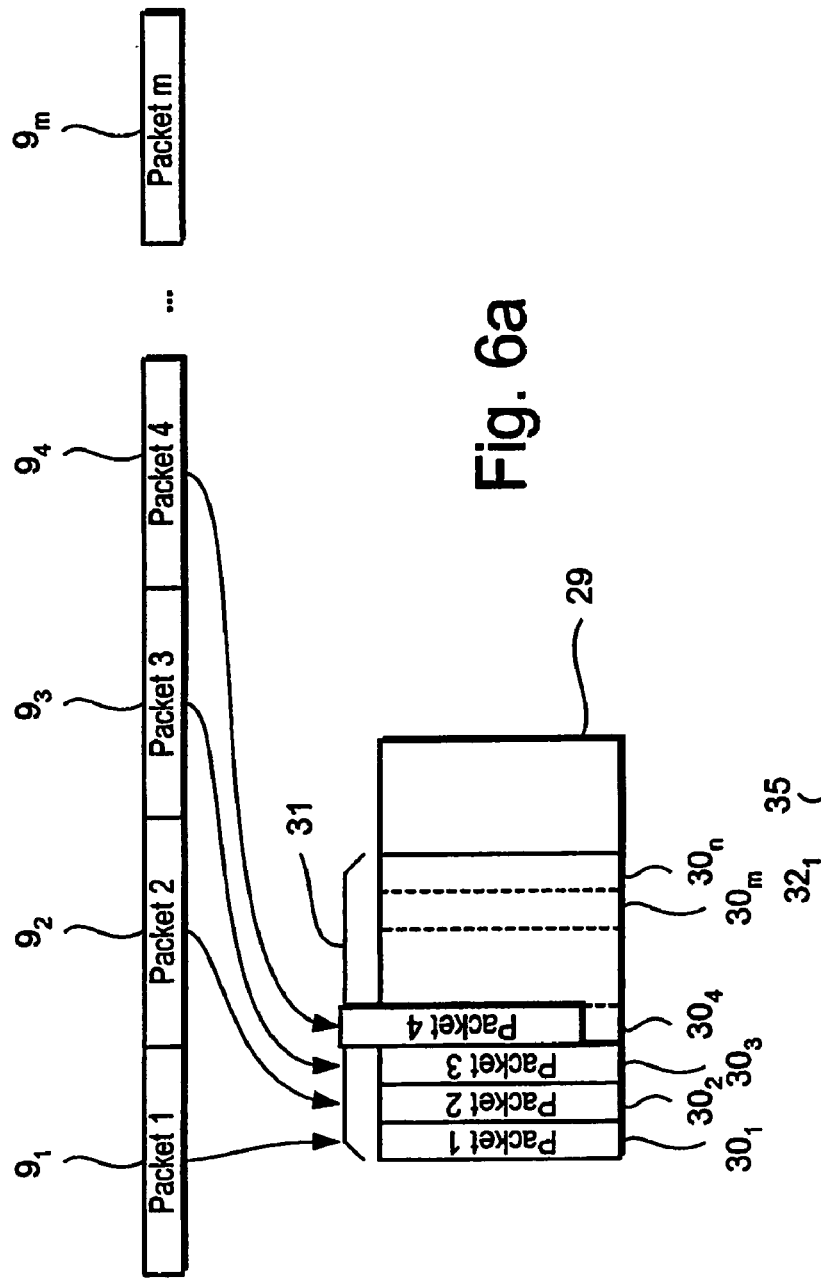
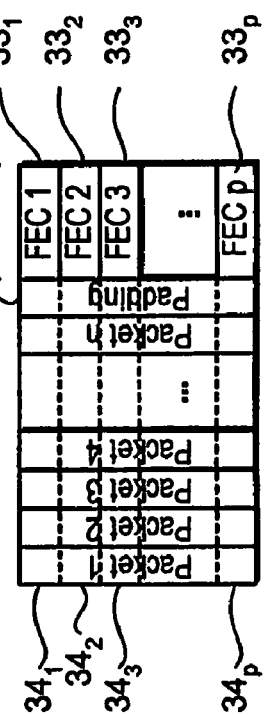

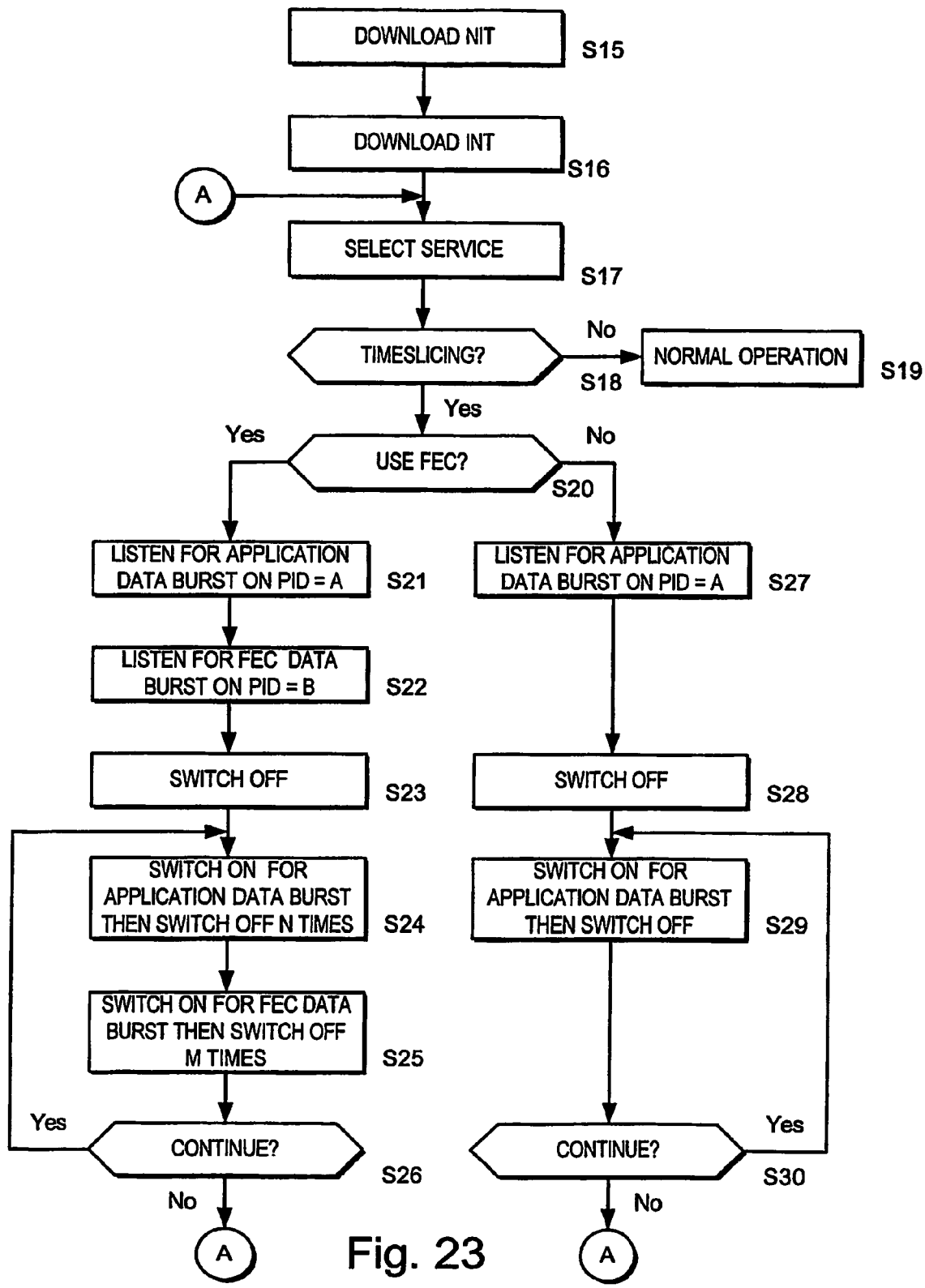

BURST TRANSMISSION

CROSS REFERENCE TO RELATED APPLICATIONS

This application is the U.S. National Stage of International Application Number PCT/IB2004/051837 filed Sep. 23, 2004, published in English Apr. 7, 2005 under International Publication Number WO 2005/032034 A1, and applicant claims priority from Great Britain Application Number GB 0322777.4 filed Sep. 29, 2003.

FIELD OF THE INVENTION

The present invention relates to a method of transmitting bursts in a communications system, particularly, although not exclusively, to a method of transmitting bursts in a digital video broadcasting (DVB) network.

BACKGROUND ART

Mobile communications systems are known which can provide enough bandwidth to allow streaming of video using advanced compression techniques, such as MPEG-4.

DVB receivers are known in applications such as digital television. Usually, DVB receivers are fixed and mains-powered. However, mobile handheld terminals are usually battery-powered and so power is limited.

The average power consumption of a DVB receiver can be reduced by using a scheme based on time division multiplexing (TDM). Such a scheme is called time slicing.

If a service is requested, data can be transmitted using time slicing. Bursts of data are sent using significantly higher bandwidth compared to the bandwidth needed to send the data at a rate, which is appropriate for direct use or rendering. Each burst includes an indication of time to the beginning of the next burst, which is referred to as "delta-t". Between bursts, data is not transmitted, allowing other services to use the bandwidth allocated to the service. Thus, the receiver need only stay active for a portion of time while receiving bursts. Nevertheless, received bursts can be buffered and consumed at a rate intended for use or rendering.

In most DVB transmission systems, such as terrestrial DVB (DVB-T), data is transmitted unidirectionally to receivers. Forward error correction may be included in the transmitted data to recover data. However, the receiver may not be configured for forward error correction or for a particular forward error correction scheme.

The present invention seeks to ameliorate this drawback and/or to provide a method of transmitting bursts.

SUMMARY OF THE INVENTION

According to a first aspect of the present invention there is provided a method of transmitting bursts in a communications network, the method comprising providing data for transmission, providing forward error correction (FEC) data for said data, forming a first set of bursts comprising transmission data and forming a second set of bursts comprising FEC data.

This can have the advantage that a receiver can selectively choose whether to receive FEC data.

The method may comprise transmitting said first set of bursts via a first channel, and transmitting said second set of bursts via a second, different channel. The method may comprise providing a first parameter for indicating a timing offset between a first, earlier burst comprising at least some of said transmission data and a second, later burst comprising further transmission data, providing a second parameter for indicating a timing offset between a third, earlier burst comprising at least some of said FEC data and a fourth, later burst comprising further FEC data, forming said first burst including said first timing parameter and forming said third burst including said second timing parameter. The at least some of said transmission data may comprise some of said transmission data and the further transmission data comprises some more of said transmission data. Alternatively, the at least some of said transmission data comprises all of said transmission data and the further transmission data may comprise additionally provided transmission data. The at least some of said FEC data may comprise some of said FEC data and said further FEC data may comprise some more of said FEC data. The at least some of said FEC data comprises all of said FEC data and the further FEC data may comprise some additionally provided FEC data.

The method may further comprise dividing said first burst between a first set of packets, identifying each of said first set of packets with a first identity, dividing said third burst between a second set of packets and identifying each of said second set of packets with a second identity. The first and second identities may be the same. The method may comprise dividing said second burst between a third set of packets; wherein providing said first timing parameter may comprise specifying a time until a start of a first one of said third set of packets. The method may comprise dividing said fourth burst between a fourth set of packets; wherein providing said second timing parameter comprises specifying a time until a start of a first one of said fourth set of packets. The method may comprise preparing service information and including said second identity in said service information. The method may comprise including said second identity in a descriptor and including said descriptor in a table forming part of said service information. The transmission data may comprise a plurality of data packets, and said method may comprise placing at least some of data packets in respective ones of a first set of sections. The method may comprise including said first timing parameter in at least one of said first set of sections. The method may comprise calculating a timing parameter for each section based on said first timing parameter and including a respective timing parameter in each of said first set of sections. The FEC data may comprises a plurality of data packets, and the method may comprise placing at least some of data packets in respective ones of a second set of sections. The method may comprise including said second timing parameter in at least one of said second set of sections. The method may comprise calculating a timing parameter for each section based on said second timing parameter and including a respective timing parameter in each one of said second set of sections.

The method may comprise providing a first parameter for identifying a burst comprising at least some of said transmission data, providing a second parameter for identifying at least one burst comprising FEC associated with said at least some of said transmission data, forming a first burst including said first identifying parameter and forming a second burst including said second identifying parameter.

The method may comprise labeling at least one burst of said first set of bursts with an identifier and labeling at least one burst of said second set of bursts with a corresponding identifier, preferably the same identifier. This can help interleaving of said first and second sets of bursts since FEC data for corresponding transmission data can be found.

According to a second aspect of the present invention there is provided a method of internet protocol datacasting over a digital broadcasting network using the method.

According to a third aspect of the present invention there is provided a computer program comprising computer program instructions for causing data processing means to perform the method.

According to a fourth aspect of the present invention there is provided a: system of transmitting bursts in a communications network comprising providing data for transmission, providing forward error correction (FEC) data for said data, forming a first set of bursts comprising transmission data and forming a second set of bursts comprising FEC data.

According to a fifth aspect of the present invention there is provided a network element comprising means for providing data for transmission, means for providing forward error correction (FEC) data for said data, means for forming a first set of bursts comprising transmission data and means for forming a second set of bursts comprising FEC data.

According to a sixth aspect of the present invention there is provided a multiprotocol encapsulator comprising an input for providing data for transmission, a processor for providing forward error correction (FEC) data for said data, a processor for forming a first set of bursts comprising transmission data and a processor for forming a second set of bursts comprising FEC data.

According to a seventh aspect of the present invention there is provided a terminal for receiving bursts from a communications network comprising means for receiving a first set of bursts comprising transmission data and means for receiving a second set of bursts comprising forward error correction (FEC) data for said transmission data.

BRIEF DESCRIPTION OF THE DRAWINGS

Embodiments of the present invention will now be described by way of example with reference to the accompanying drawings in which:

FIGS. 6a, 6b and 6c show a process by which forward error correction (FEC) data is calculated in one embodiment of the present invention;

FIG. 23 is process flow diagram of a process of preparing for, receiving and processing time-sliced bursts performed by the mobile telephone handset shown in FIG. 21.

DETAILED DESCRIPTION OF THE INVENTION

Communication Network 1

Figure 1:
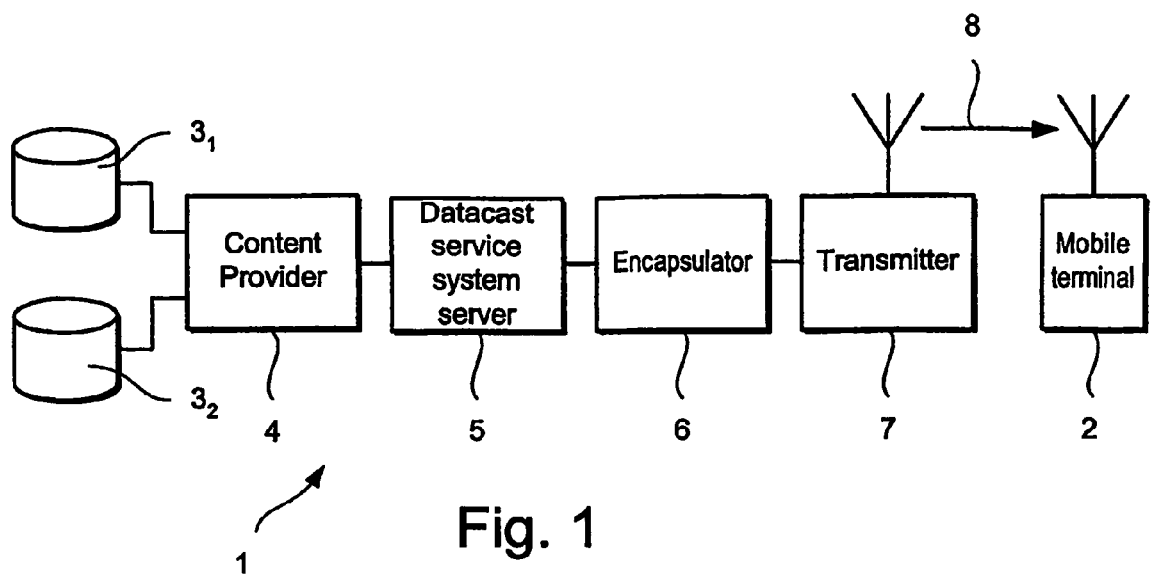
FIG. 1 shows an embodiment of a communication system according to the present invention.

Referring to FIG. 1, a communications network 1 for delivering content to a mobile terminal 2 is shown. The communications network 1 includes a terrestrial digital video broadcasting (DVB-T) or handheld digital video broadcasting (DVB-H) network which is used as a broadcast access network to deliver content as an Internet Protocol Data Casting (IPDC) service. However, other digital broadcast networks may be used including other types of DVB networks, such as a cable DVB network or satellite DVB network, a Digital Audio Broadcasting (DAB) network or an Advance Television System Committee ATSC) network or a terrestrial Integrated Services Digital Broadcasting-Terrestrial (ISDB-T) network.

The communications network 1 includes sources $3_1$, $3_2$ of content, for example in the form of video, audio and data files, a content provider 4 for retrieving, re-formatting and storing content, a datacast service system server 5 for determining service composition, a multi-protocol encapsulation (MPE) encapsulator 6 and a transmitter 7 for modulating and broadcasting a signal 8 to receivers (not shown) including mobile terminal 2.

Figure 2:
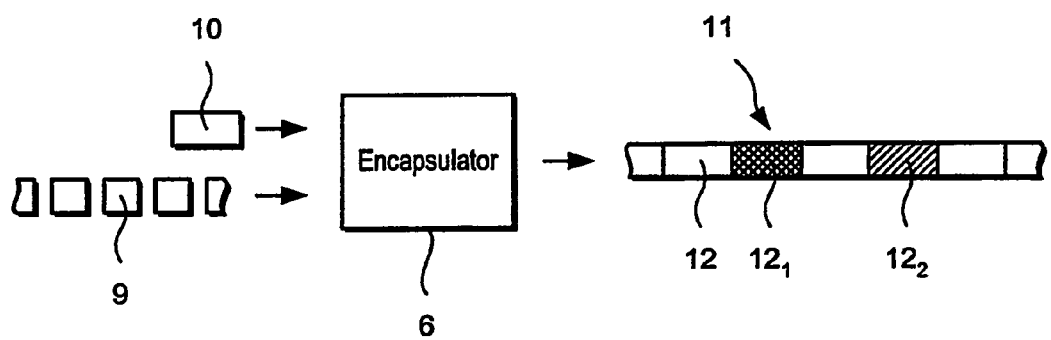
FIG. 2 shows a multiprotocol encapsulation (MPE) encapsulator which outputs transport stream packets carrying time-sliced bursts in accordance with one embodiment of the present invention.

Referring to FIG. 2, the MPE encapsulator 6 receives a stream of data 9 and service information data 10, such as MPEG program specific information (PSI) and DVB service information (SI), and generates a transport stream 11 comprising MPEG-2 transport stream (TS) packets 12, $12_1$, $12_2$ typically 188 bytes long, according to International Organization for Standards/International Electrotechnical Commission (ISO/IEC) Standard 13818-1 "Information Technology-Generic coding of moving pictures and associated audio information: Systems".

The MPE encapsulator 6 may receive a plurality of streams (not shown) and divide, combine and recombine them to form one or more new stream. Each stream may result in one or more application data bursts. Formation of application bursts will be described in more detail later.

Figure 3:
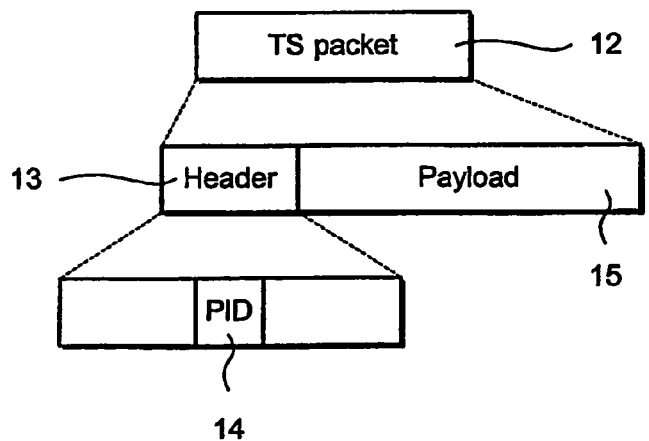
FIG. 3 illustrates an exemplary transport stream packet.

Referring also to FIG. 3, the transport stream 11 is divided into a number of logical channels, referred to as "elementary streams". The elementary stream to which a TS packet 12 belongs is defined in a packet header 13 using a packet identifier (PID) 14. The packet identifier 14 can be used to identify contents of a TS packet payload 15.

For example, the contents of a first TS packet $12_1$ may be identified as containing all or part of a network information table (NIT) by specifying PID=0x0010 (as a hexadecimal number). The contents of a second TS packet $12_2$ may be identified as being video, audio or another type of data by specifying a PID value between 0x0030 to 0x1FFE (as hexadecimal number).

A channel for time-sliced burst transmission, time slicing channel, comprises transmission time periods. During these transmission time periods, time slicing bursts are transmitted and the time for the next burst, referred to as "delta-t", is signaled. Delta-t is not necessarily fixed. Between transmission periods, other time slicing channels can be transmitted. Each time slicing channel has their own PID value. It is also possible to multiplex two or more time slicing channels into one time period, because they can be separated (demultiplexed) according to the PID value.

Referring again to FIG. 1, the DVB transmitter 7 receives a signal from the encapsulator 6 which it modulates, amplifies and broadcasts.

Other network elements may be provided, such as a multiplexer (not shown) for combining a plurality of services and a gap-filler transmitter for receiving and re-transmitting the signal 8. Furthermore, another communications network (not shown), such as a public land mobile network preferably in the form a $2^{nd}$ or $3^{rd}$ generation mobile network such as GSM or UMTS respectively, may be provided for providing a return channel from the mobile terminal 8 to the communications network 1. A further communications network (not shown), such as the Internet, may be provided to connect distributed elements of the communications network 1, such as content provider 4 and service system server 5.

MPE Encapsulator 6

Figure 4:
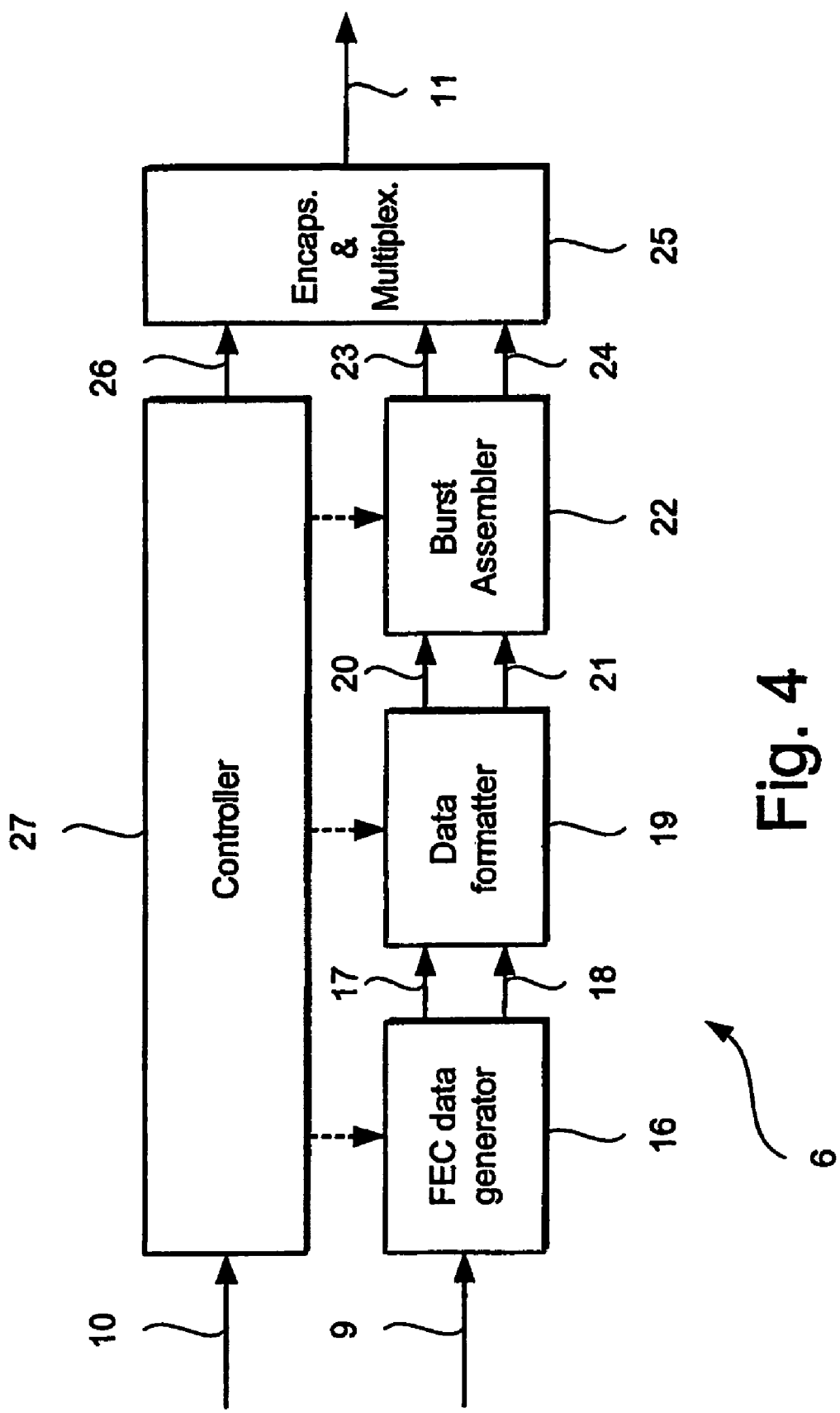
FIG. 4 is a schematic diagram of an embodiment of an MPE encapsulator in accordance with the present invention.

Referring to FIG. 4, the MPE encapsulator 6 is shown in more detail.

The MPE encapsulator 6 comprises means 16 for generating from the stream of data 9 forward error correction (FEC) data which outputs a stream 17 of application data packets and a stream or set 18 of FEC data packets, means 19 for placing data 17, 18 in sections which outputs a stream of application data sections 20 and FEC data sections 21 and means 22 for arranging sections and assembling them into bursts 23 comprising application data and bursts 24 comprising FEC data. The MPE encapsulator 6 also comprises means 25 for placing sections including sections 26 comprising service data generated by a controller 27 from service information data 10 into transport stream packets and multiplexing transport stream packets into a single transport stream 11. The controller 27 may also manage operation of the other means 16, 19, 22, 25.

The MPE encapsulator may be implemented in software using a personal computer or in hardware. It will be appreciated that a number microprocessors or digital signal processors may be used.

Operation of the MPE encapsulator 6 will now be described in more detail:

FEC Data Generating Means 16

Figure 5:
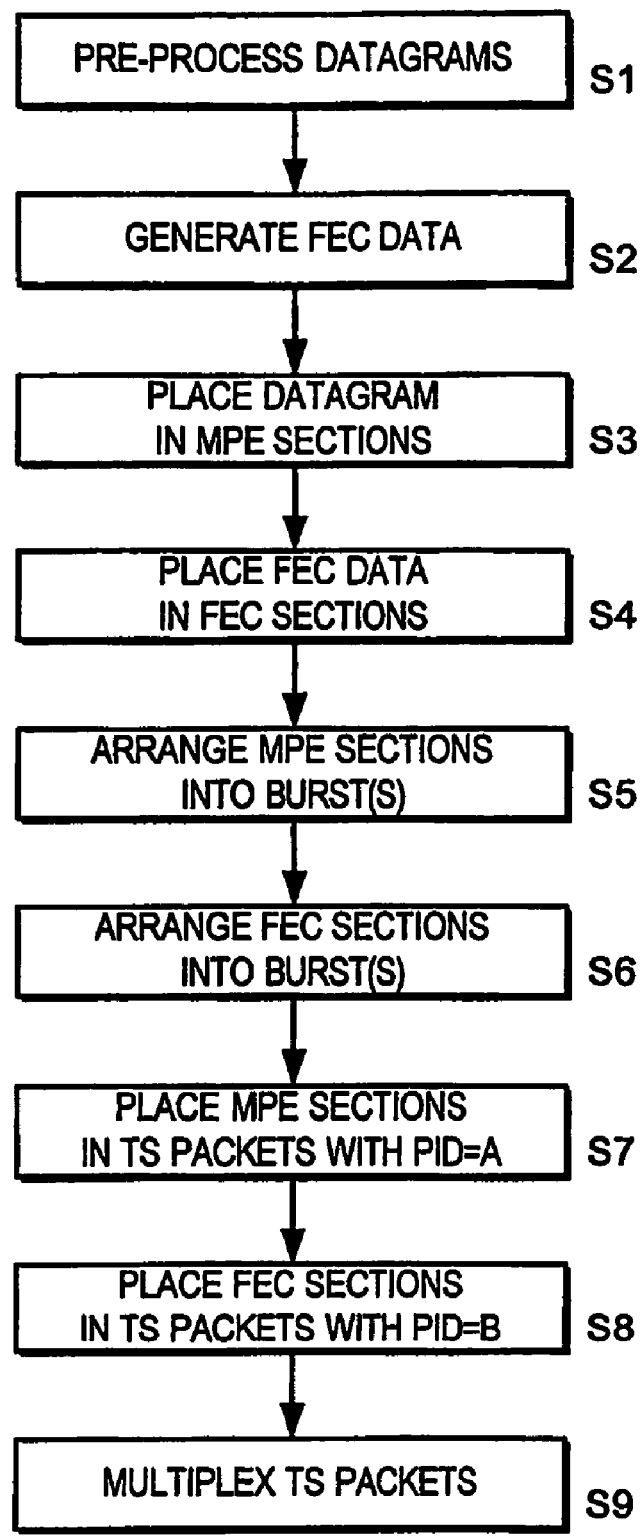
FIG. 5 is a process flow diagram of a first process performed by the MPE encapsulator shown in FIG. 4 in accordance with the present invention.

Referring to FIGS. 5 and 6a, the forward error codes generating means 16 receives the stream 9 of data packets $9_1, 9_2, 9_3, 9_4, 9_m$, in the form of IP datagrams, from the datacast service system server 5 (FIG. 1) and, if necessary, pre-processes them by arranging them in order and/or dropping selected data packets, for example based on IP address (step S1). It will be appreciated that the MPE encapsulator 6 may receive Ethernet frames (not shown) and thus, additional processing, such as removing Ethernet frame structure, may be required.

The FEC generating means 16 generates application data 17 and FEC data 18 for the data packets $9_1, 9_2, 9_3, 9_4, 9_m$ (step S2) in a form such as Reed-Solomon (RS) data.

The data packets $9_1, 9_2, 9_3, 9_4, 9_m$ are stored in a coding table or array 29. The data packets $9_1, 9_2, 9_3, 9_4, 9_m$ are stored sequentially in columns $30_1, 30_2, 30_3, 30_4, 30_m$ in a portion of the table 29 referred to as the application data table 31 which in this case occupies the left-most portion of the table 29.

In this example, one data packet $9_1$ occupies one column $30_1$. However, one data packet $9_1$ may occupy two columns $30_1, 30_2$ or any whole number of columns $30_1, 30_2, 30_3, 30_4, 30_m, 30_n$. One data packet $9_1$ need not occupy a whole number of columns $30_1, 30_2, 30_3, 30_4, 30_m, 30_n$ but may only partially occupy one column $30_1$ with the remaining, unoccupied portion of the column being filled with padding bits (not shown) and/or at least part of one or more other data packets $9_2, 9_3, 9_4, 9_m$. Thus, a data packet $9_1$ may be divided between two or more columns $30_1, 30_2$. Alternatively, one data packet $9_1$ may occupy a whole number of columns $30_1, 30_2$ and partially occupy one further column $30_3$. The contents of a data packet $9_1, 9_2, 9_3, 9_4, 9_m$ can occupy one or more addressable storage locations of one or more columns $30_1, 30_2, 30_3, 30_4, 30_m, 30_n$.

In this example, there are not enough to data packets $9_1, 9_2, 9_3, 9_4, 9_m$ to fill the application data table 31. Therefore, any unfilled column $30_n$ is filled with a column's-worth of padding $32_1$.

Referring to FIG. 6b, once a given number of data packets $9_1, 9_2, 9_3, 9_4, 9_m$ have been stored or the application data table 31 has been filled, FEC row data $33_1, 33_2, 33_3, 33_p$ is calculated. The FEC row data $33_1, 33_2, 33_3, 33_p$, preferably in the form of Reed-Solomon data, is calculated for each row $34_1, 34_2, 34_3, 34_p$ and entered into a portion of the table 29 referred to as the Reed-Solomon data table 35.

In one embodiment of the invention, the coding table 29 has 255 columns. For example, the application data table 31 may comprise 191 columns and the Reed-Solomon table 35 may comprise 64 columns. Preferably, the application data table 31 occupies the left-most portion of table 29 and Reed-Solomon table 35 occupies the right-most portion of the table 29. In one embodiment of the invention, the coding table 29 may comprise a selectable number of rows, up to 1024 rows. Preferably, the table 29 comprises one-byte addressable elements. Thus, a table with 255 columns and 1024 rows way store up to 2 Mbits of data.

In one embodiment of the invention, the data packets $9_1, 9_2, 9_3, 9_4, 9_m$ are stored sequentially in rows, wherein the padding is also applied to rows, and FEC column data (not shown) calculated for each column. In other words, rows and columns are interchangeable. It will also be appreciated that the length or size of data packets $9_1, 9_2, 9_3, 9_4, 9_n$ can vary. The data packets $9_1, 9_2, 9_3, 9_4, 9_n$ may be an uneven size. The padding $32_1$ may be omitted when calculating FEC row data $33_1, 33_2, 33_3, 33_p$.

Data within the completed coding table 29 may be referred to as an "MPE-FEC frame".

Figure 6C:
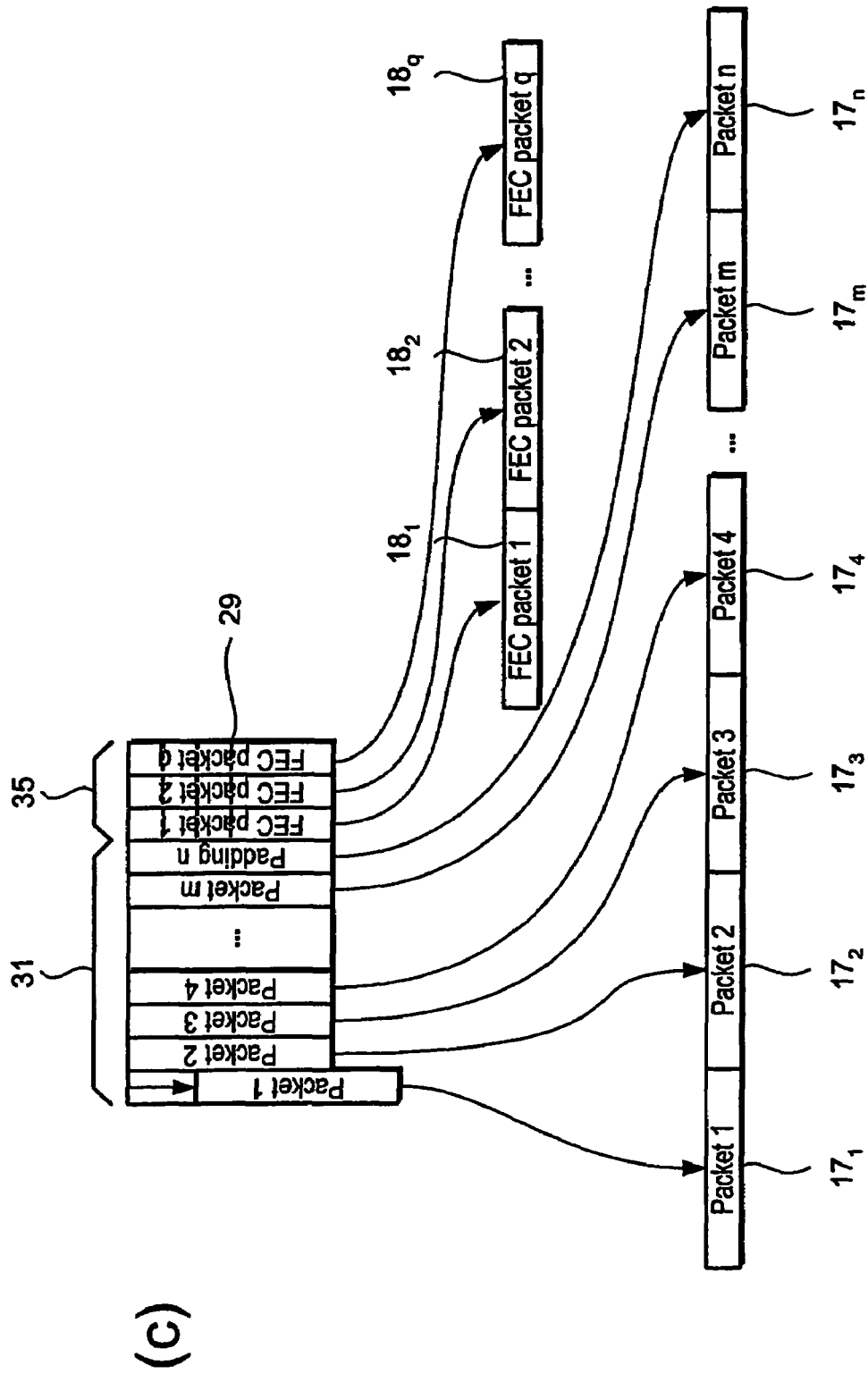

Referring to FIG. 6c, application data packets $17_1, 17_2, 17_3, 17_4, 17_m, 17_n$ and FEC data packets $18_1, 18_2, 18_q$ are read out of the coding table 29. The FEC data packets $18_1, 18_2, 18_q$ are read out column by column and so each packet comprises a portion of plural FEC row data $33_1, 33_2, 33_3, 33_p$.

In one embodiment of the invention, the application data packets $17_1, 17_2, 17_3, 17_4, 17_m, 17_n$ are read out of the table, preferably as they are written into it, and forwarded before the FEC row data $33_1$, $33_2$, $33_3$, $33_p$ are calculated. Copies of the application data $17_1$, $17_2$, $17_3$, $17_4$, $17_m$, $17_n$ are left in the table for the FEC calculation. After FEC row data $33_1$, $33_2$, $33_3$, $33_p$ has been calculated and FEC data packets $18_1$, $18_2$, $18_q$ are read out and the table can be emptied.

It will be appreciated that if no stuffing data is used then the application data packets $17_1$, $17_2$, $17_3$, $17_4$, $17_m$, $17_n$ simply comprise the data packets $9_1$, $9_2$, $9_3$, $9_4$, $9_n$. Even if stuffing data is used, any column $30_n$ comprising padding data need not be transmitted.

The process of filling the coding table 29, calculating FEC row data $33_1$, $33_2$, $33_3$, $33_p$ and emptying the coding table 29 is then repeated for the next set of data 9.

Formatting Means 19

Referring to FIGS. 4, 5, 7 and 8 the formatting means 19 generates MPE sections 20 comprising application data packets $17_1$, $17_2$, $17_3$, $17_m$, $17_n$ and FEC sections 21 comprising FEC data packets $18_1$, $18_2$, $18_q$ preferably in accordance with Section 7 of European Telecommunications Standards Institute (ETSI) Standard 301 192 "Digital Video Broadcasting (DVB); DVB specification for data broadcasting" V1.3.1 (2003-01) (steps S3 & S4).

Figure 7:
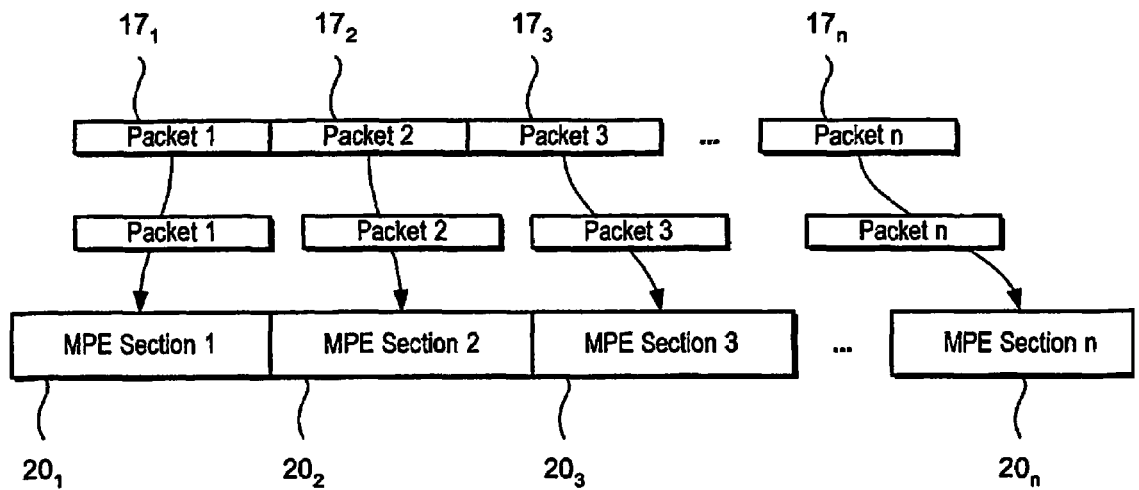
FIG. 7 shows application data packets being placed in MPE sections in one embodiment of the present invention.

Referring to FIG. 7, the formatting means 19 places application data packets $17_1$, $17_2$, $17_3$, $17_n$ into MPE sections $20_1$, $20_2$, $20_3$, $20_n$ compliant with the DSM-CC section format, in one embodiment of the present invention using the syntax defined in Table 1 below:

TABLE 1

| Syntax | No. of bits | Identifier |
|---|---|---|
| datagram_section( ) { | | |
| table_id | 8 | uimsbf |
| section_syntax_indicator | 1 | bslbf |
| private_indicator | 1 | bslbf |
| Reserved | 2 | bslbf |
| section_length | 12 | uimsbf |
| MAC_address_6 | 8 | uimsbf |
| MAC_address_5 | 8 | uimsbf |
| Reserved | 2 | bslbf |
| payload_scrambling_control | 2 | bslbf |
| address_scrambling_control | 2 | bslbf |
| LLC_SNAP_flag | 1 | bslbf |
| current_next_indicator | 1 | bslbf |
| section_number | 8 | uimsbf |
| last_section_number | 8 | uimsbf |
| MAC_address_4 | 8 | uimsbf |
| MAC_address_3 | 8 | uimsbf |
| MAC_address_2 | 8 | uimsbf |
| MAC_address_1 | 8 | uimsbf |
| if (LLC_SNAP_flag == "1") { | | |
| LLC_SNAP( ) | | |
| } else { | | |
| for (j=0;j<N1;j++) { | | |
| IP_datagram_data_byte | 8 | bslbf |
| } | | |
| } | | |
| if (section_number == last_section_number) { | | |
| for (j=0;j<N2;j++) { | | |
| stuffing_byte | 8 | bslbf |
| } | | |
| } | | |
| if (section_syntax_indicator =="0") { | | |
| Checksum | 32 | uimsbf |
| } else { | | |
| CRC_32 | 32 | rpchof |
| } | | |
| } | | |

In one embodiment of the invention, each application data packet $17_1$, $17_2$, $17_3$, $17_n$ is placed in a corresponding MPE section $20_1$, $20_2$, $20_3$, $20_n$, for example as illustrated in FIG. 7.

Figure 8:
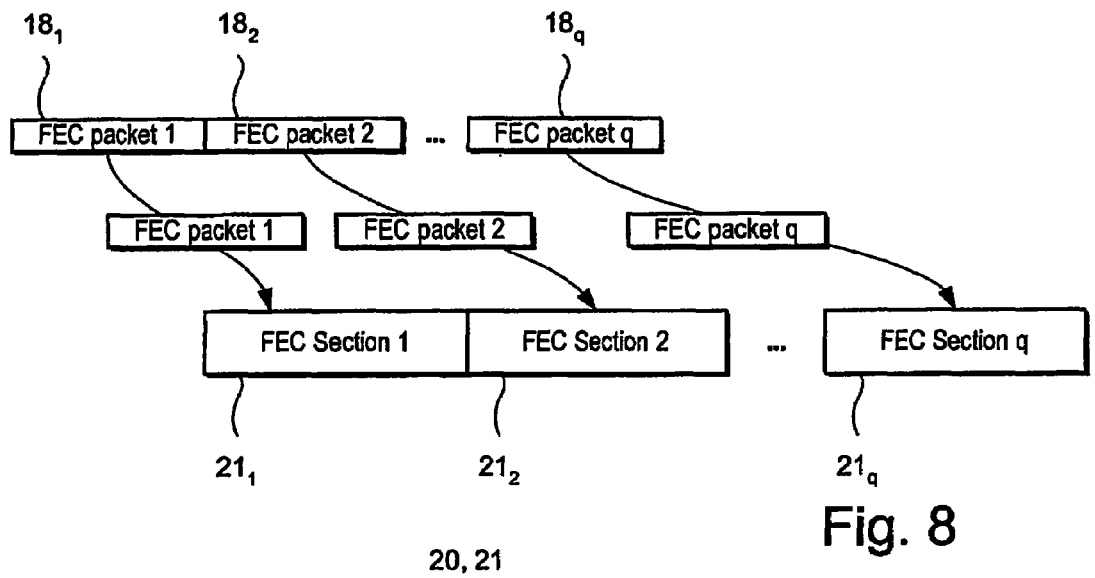
FIG. 8 shows FEC data packets being placed in FEC sections in one embodiment of the present invention.

Referring to FIG. 8, the formatting means 19 places FEC data packets $18_1$, $18_2$, $18_q$ into so-called FEC sections $21_1$, $21_2$, $21_q$ compliant with the DSM-CC section format, in one embodiment of the present invention using the syntax defined in Table 2 below:

TABLE 2

| Syntax | No. of bits | Identifier |
|---|---|---|
| FEC_section ( ) { | | |
| table_id | 8 | uimsbf |
| section_syntax_indicator | 1 | bslbf |
| reserved_for_future_use | 1 | bslbf |
| Reserved | 2 | bslbf |
| section_length | 12 | uimsbf |
| padding_columns | 8 | uimsbf |
| reserved_for_future_use | 8 | bslbf |
| Reserved | 2 | bslbf |
| reserved_for_future_use | 5 | bslbf |
| current_next_indicator | 1 | bslbf |
| section_number | 8 | uimsbf |
| last_section_number | 8 | uimsbf |
| real_time_parameters( ) | | |
| for( i=0; i<N; i++ ) { | | |
| rs_data_byte | 8 | uimsbf |
| } | | |
| CRC_32 | 32 | uimsbf |
| } | | |

In one embodiment of the invention, each FEC data packet $18_1$, $18_2$, $18_q$ is placed in a corresponding FEC section $21_1$, $21_2$, $21_q$.

Figure 9:
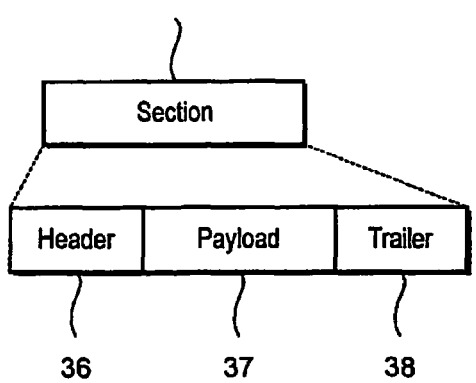
FIG. 9 illustrates an example of a section.
Figure 10:
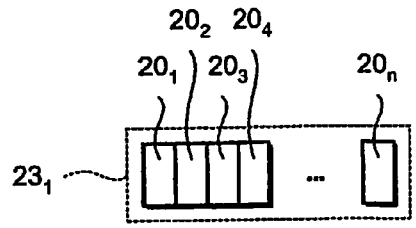
FIG. 10 illustrates an exemplary application data burst.
Figure 11:
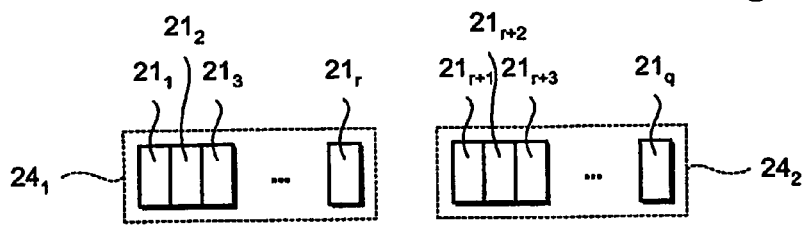
FIG. 11 illustrates exemplary FEC data bursts.

Referring to FIG. 9, the general structure of an MPE section 20 or an FEC section 21 is shown. A section 20, 21 comprises a header 36, a payload 37 and a trailer 38. For an MPE section $20_1$, $20_2$, $20_3$, $20_n$, the payload 37 includes an application data packet $17_1$, $17_2$, $17_3$, $17_n$ (FIG. 7). For an FEC section $21_1$, $21_2$, $21_q$, the payload 37 includes a FEC data packet $18_1$, $18_2$, $18_q$ (FIG. 8).

Burst Assembling Means 22

In a conventional DVB network, data for a given service (or set of services) are transmitted continuously in a logical channel, usually at a rate appropriate for consuming the service. For example, if the service is a video streaming service, video data is transmitted at a rate which allows the video data to be rendered as-and-when it is received at a receiver.

In an embodiment of a DVB network according to the present invention, data for a given service (or set of services) are transmitted in bursts in a logical channel. The channel can be referred to as a "time slice channel". Between bursts, no data for the service is transmitted in the time slice channel. Nevertheless, between bursts, data for other services may be transmitted, for example in another channel.

It is noted that the logical channel is time sliced. This may be in addition to dividing a physical channel into time slots and assigning each logical channel to a time slot.

In a time slice channel, data bursts are transmitted at a higher (instantaneous) peak bit rate than data transmitted continuously in a conventional channel. Preferably, all or a majority of the available bandwidth is used to when transmitting a burst.

Time slicing has advantages. For example, a receiver can be switched off between bursts, thereby saving power. Also, the receiver can monitor transmissions in neighboring cells between bursts so that the receiver can make a handover if necessary seemingly without interruption.

As will be explained in more detail later, in one embodiment of the invention, receivers are notified that time slicing is being used e.g. through a network information table (NIT) or through an IP/MAC Notification Table (INT).

Once notified that time slicing is being used, receivers can switch off between bursts. However, in order to do so, they need information regarding when to expect bursts. This can be achieved by including, in each burst, information on the time to the beginning of the next burst, which is referred to as "delta-t". In one embodiment of the invention, delta-t is defined as the time from the end of one burst to the beginning of the next burst. In another embodiments of the invention, delta-t may be defined as the time from the beginning of one burst to the beginning of the next burst or a time from the end of one burst to the end of the next burst. In yet another embodiment of the invention, delta-t information may be given in one or more sections within a burst and delta-t is defined as the time from the beginning of the section to the beginning of the next burst. Preferably, no bursts for the service will be transmitted within the announced duration of delta-t. Other information about bursts, such as the duration of the burst, can also be included and is referred to as "real-time parameters".

In an embodiment of the present invention, MPE sections $20$ carrying application data $17$ are assembled into a first set of bursts $23$ (only one shown) and FEC sections $21$ carrying FEC data $18$ are assembled into a second, different set of bursts $24$.

Referring to FIGS. 4, 5, 6c, 7 and 10, the burst assembling means $22$ arranges the MPE sections $20_1$, $20_2$, $20_3$, $20_n$ carrying application data $17_1$, $17_2$, $17_3$, $17_4$, $17_m$, $17_n$ into an application burst $23_1$ (step S5). MPE sections $20_1$, $20_2$, $20_3$, $20_n$ may be sent in one or more plurality of bursts.

Referring to FIGS. 4, 5, 6c, 8 and 11, the burst assembling means $22$ arranges the FEC sections $21_1$, $21_2$, $21_3$, $21_r$ and FEC sections $21_{r+1}$, $21_{r+2}$, $21_{r+3}$, $21_q$ into first and second FEC bursts $24_1$, $24_2$ respectively (step S6). Alternatively, FEC sections $21_1$, $21_2$, $21_3$, $21_r$, $21_{r+1}$, $21_{r+2}$, $21_{r+3}$, $21_q$ may be assembled into a single burst or divided between three or more bursts.

The burst assembling means $22$ includes real time parameters in MAC_address_1 to MAC address_4 fields of each header $36$ (FIG. 9) as defined in Table 1 or 2 above of each MPE section $20_1$, $20_2$, $20_3$, $20_n$ and each FEC sections $21_1$, $21_2$, $21_q$. For example, Table 3 below shows real time parameter syntax in one embodiment of the invention:

TABLE 3

| Syntax | No. of bits | Identifier |
|---|---|---|
| realtime paramters( ) { | | |
| delta_t | 12 | uimsbf |
| table_boundary | 1 | bslbf |
| burst_boundary | 1 | bslbf |
| Address | 18 | uimsbf |
| } | | |

In one embodiment of the present invention, MAC_address_5 field is used to indicate a burst number. An application data burst can be assigned a burst number and a corresponding FEC data burst can be assigned the same burst number. This allows a receiver to identify to which application data burst one or more FEC data burst corresponds. This has an advantage of allowing interleaving depth to be increased. This will be explained in more detail later.

Figure 12:
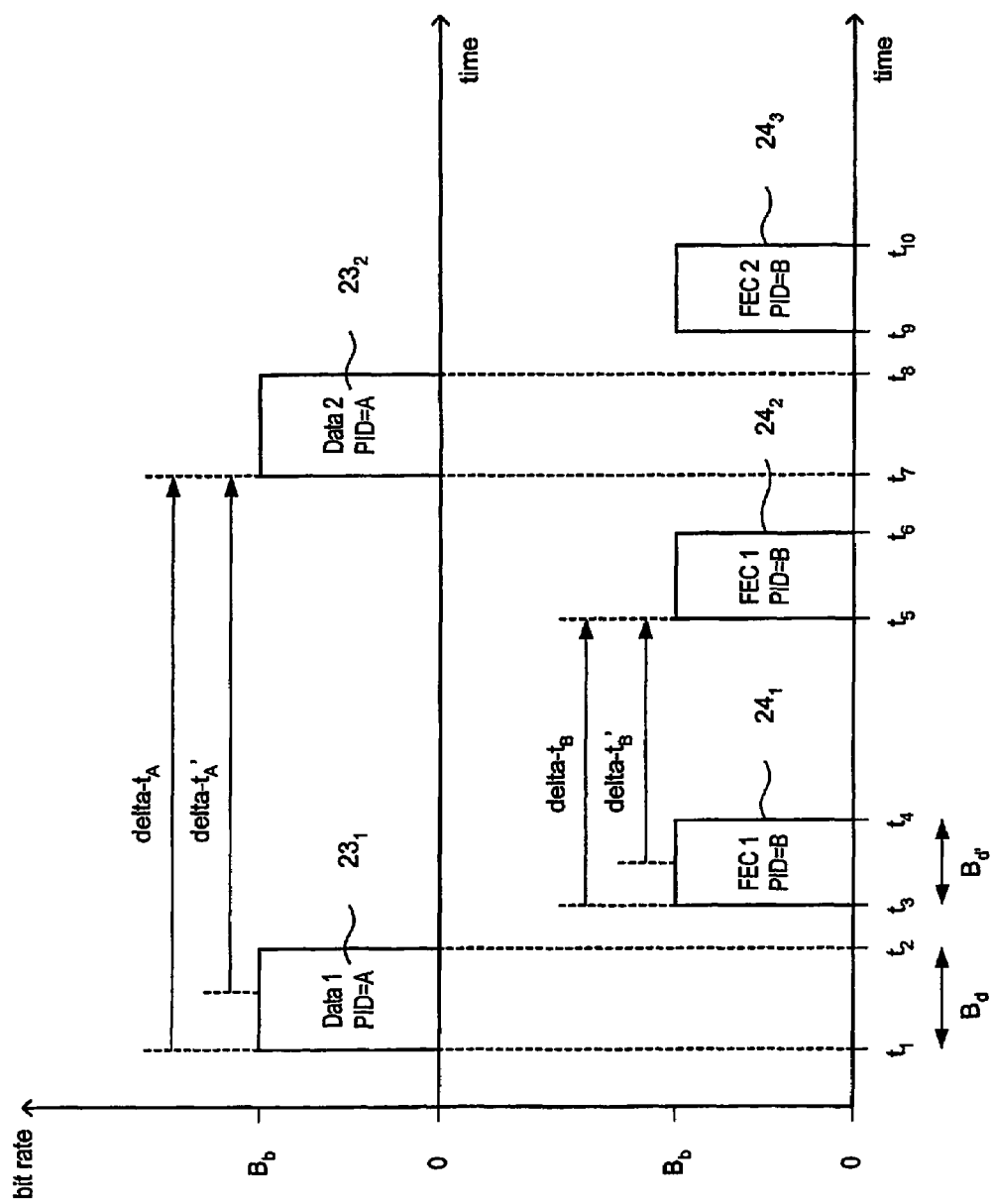
FIG. 12 shows transmission of application data bursts and FEC data bursts in one embodiment of the present invention.

Referring also to FIG. 12 and taking the example of the application burst $23_1$, in one embodiment of the invention the delta_t field indicates the time from the beginning of one section within an application burst $23_1$ to the beginning of the next application burst $23_2$. In this embodiment of the invention a value of delta-t is included in all MPE sections $20_1$, $20_2$, $20_3$, $20_m$, $20_n$ within the burst $23_1$ and so the value may differ from section to section. Thus, for the first section $20_1$ the value is delta_$t_4$ and for a later section $20_2$, $20_3$, $20_m$, $20_n$ the value is delta$_{13}$ $t_4'$, wherein delta_$t_4$>delta_$t_4'$.

In one embodiment of the invention, resolution of the delta-t is 10 ms. For example, a value 0xC00 (in hexadecimal) =3072 (in decimal) indicates that the time to the beginning of the next burst is 30.72 s. The value 0x00 is reserved to indicate that no more bursts will be transmitted within the elementary stream, in other word to indicate end of service. In such a case, all MPE sections $20_1$, $20_2$, $20_3$, $20_m$, $20_n$ within the burst $23_1$ have the same value in this field.

Further in one embodiment of the invention, delta-t is defined from the TS packet $12_{A1}$ (FIG. 13) carrying the first byte of the current MPE section (not shown) to the TS packet (not shown) carrying the first byte of next burst $23_2$. Therefore, the value of delta-t can differ between MPE sections $20_1$, $20_2$, $20_3$, $20_m$, $20_n$ within the burst $23_1$.

The time indicated by delta-t is beyond the end of the maximum burst duration of the actual burst. This helps to ensure that a decoder can reliably distinguish two sequential bursts within an elementary stream.

In one embodiment of the invention, all the MPE sections $20_1$, $20_2$, $20_3$, $20_n$ (FIG. 7) comprising all the application data $17_1$, $17_2$, $17_3$, $17_m$, $17_n$ (FIG. 6c) from the application table 31 (FIG. 6c) is comprised in the application burst $23_1$ (FIG. 10) and not divided between plural application bursts. Furthermore, it is preferable that the burst $23_1$ contains complete data packets $17_1$, $17_2$, $17_3$, $17_4$, $17_m$, $17_n$, i.e. that data packets $17_1$, $17_2$, $17_3$, $17_4$, $17_m$, $17_n$ are not fragmented between bursts. Also, transmission of empty MPE sections, i.e. an MPE section with no payload, is preferably to be avoided.

Each application burst $23_1$ may contains at least one MPE section $20_1$, $20_2$, $20_3$, $20_4$, $20_n$ carrying a proper data packet $17_1$, $17_2$, $17_3$, $17_4$, $17_m$, $17_n$ containing a network layer address (not shown), which is one of the addresses an IP/MAC Notification Table (INT) has associated with the elementary stream.

The table_boundary field is a flag. When the flag is set to "1", it indicates that the current section is the last section of the table. In the case of MPE section, this flag indicates the last section of the application data table. In the case of MPE-FEC section, this flag indicates the last section of the RS data table.

The burst_boundary field is a flag. When the flag is set to "1", it indicates that the current section, either MPE or MPE-FEC section, is the last section within the current burst.

The address field specifies the position, in the corresponding table 29 (FIG. 6a), of the first byte of the payload carried within the MPE section $20_1$, $20_2$, $20_3$, $20_4$, $20_n$. All sections delivering data for a table 29 are delivered in ascending order according to the value of this field. The bytes position is a zero-based linear address within the table 29, starting from the first row of the first column, and increasing towards the end of the column. At the end of the column, the next byte position is at the first row of the next column. Thus, the address field of the first MPE section $20_1$ of the table 29 contains the value "0" and addressing starts from zero for each table 29.

Taking now the example of the FEC burst $24_1$, in one embodiment of the invention, the delta_t field indicates the time from the beginning of one section to the beginning of the next FEC burst $24_2$. Preferably, a value of delta-t is included in all FEC sections $21_1$, $21_2$, $21_3$, $21_r$ within the burst $24_1$ and so the value may differ from section to section. Thus, as illustrated in FIG. 12 and referring to FIG. 11, for the first section $21_1$ the value is delta_$t_B$ and for a later section $21_2$, $21_3$, $21_r$ the value is delta_$t_B'$, wherein delta_$t_B$>delta_$t_B'$.

Similar to the application burst $23_1$ described earlier, the FEC burst $24_1$ includes table_boundary field, the burst-_boundary field and the address fields.

Encapsulating and Multiplexing Means 25

Referring to FIGS. 4, 5, 13 and 14, the encapsulating and multiplexing means 25 places MPE sections $20_1$, $20_2$, $20_3$, $20_4$, $20_n$ into TS packets $12_{A1}$, $12_{A2}$, $12_{A3}$, $12_{A4}$, $12_{A5}$, $12_{A6}$, $12_{AS}$ having the same PID, for example PID=A, where A is hexadecimal number between 0x0030 to 0x1FFE (step S7).

The encapsulating and multiplexing means 25 places FEC sections $21_1$, $21_2$, $21_3$, $21_r$, $21_{r+1}$, $21_{r+2}$, $21_{r+3}$, $21_q$ into TS packets $12_{B1}$, $12_{B2}$, $12_{B3}$, $12_{B4}$, $12_{B5}$, $12_{B6}$, $12_{BT}$ having the same PID, for example PID=B, where B is hexadecimal number between 0x0030 to 0x1FFE (step S7).

Figure 13:
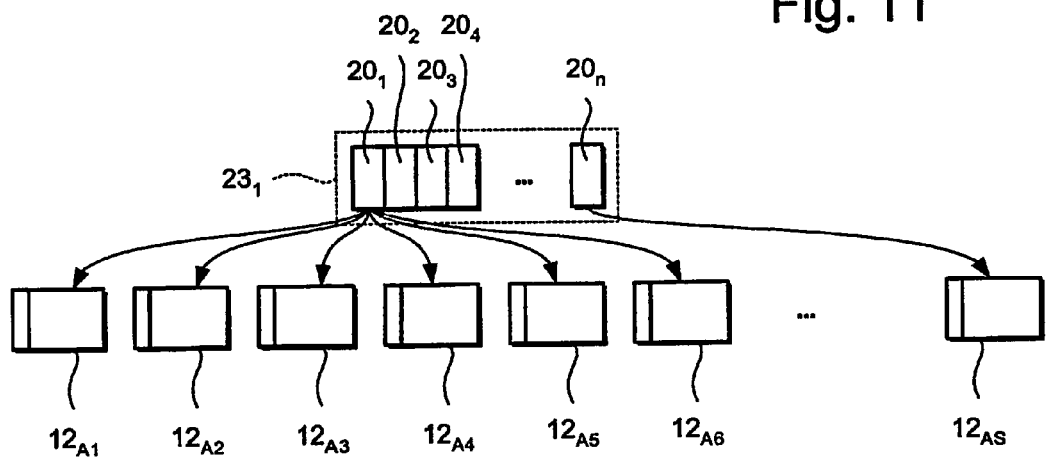
FIG. 13 illustrates exemplary encapsulation of MPE sections in transport stream packets.
Figure 14:
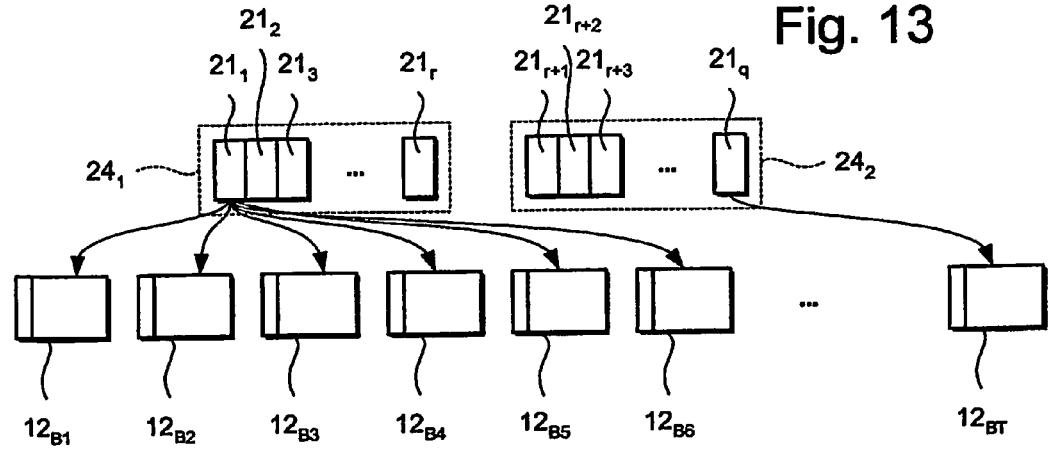
FIG. 14 illustrates exemplary encapsulation of FEC sections in transport stream packets.

In one embodiment of the invention, each MPE section 20 and each FEC section 21 is divided between six TS packets 12. In FIGS. 13 and 14, only the first MPE section $20_1$ and the first FEC section $21_1$ are shown divided for reasons of clarity. However, a fewer or greater number of TS packets 12 may be used to carry one MPE section 20 or one FEC section 21.

Figure 15:
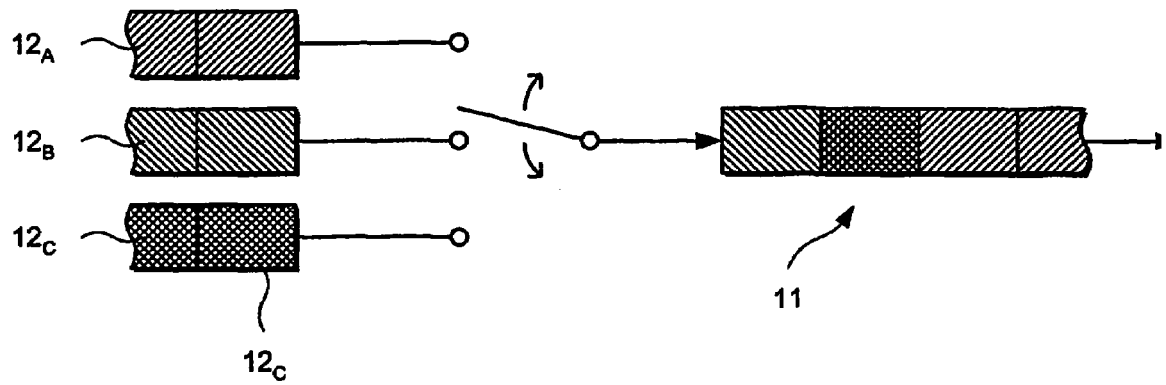
FIG. 15 shows exemplary multiplexing of transport stream packets.

Referring to FIG. 15, TS packets $12_A$ comprising TS packets $12_{A1}$, $12_{A2}$, $12_{A3}$, $12_{A4}$, $12_{A5}$, $12_{A6}$, $12_{AS}$ (FIG. 13) carrying application data 17, TS packets $12_B$ comprising TS packets $12_{B1}$, $12_{B2}$, $12_{B3}$, $12_{B4}$, $12_{B5}$, $12_{B6}$, $12_{BT}$ (FIG. 14) carrying FEC data 17 and TS packets $12_C$ carrying other data are multiplexed to form a single stream 11.

Referring again to the example shown in FIG. 12, the application burst $23_1$ is transmitted followed by FEC bursts $24_1$, $24_2$. Thus, all the FEC data $18_1$, $18_2$, $18_q$ (FIG. 6c) for an MPE-FEC frame is transmitted before application data for the next MPE-FEC frame is transmitted.

In an alternative embodiment of the invention, the application bursts $23_1$, $23_2$ and FEC bursts $24_1$, $24_2$ are generated as described earlier. However, the encapsulating and multiplexing means 25 places the FEC sections $21_1$, $21_2$, $21_3$, $21_r$, $21_{r+1}$, $21_{r+2}$, $21_{r+3}$, $21_q$ into TS packets $12_{B1}$, $12_{B2}$, $12_{B3}$, $12_{B4}$, $12_{B5}$, $12_{B6}$, $12_{BT}$ having the same PID as the TS packets $12_{A1}$, $12_{A2}$, $12_{A3}$, $12_{A4}$, $12_{A5}$, $12_{A6}$, $12_{AT}$ carrying application data sections $20_1$, $20_2$, $20_3$, $20_4$, $20_m$, $20_n$.

The processes described earlier can have one or more advantages.

For example, a time interleaving length can be adjusted by changing the time between transmitting application data and FEC bursts.

New coding schemes can be introduced more easily.

Robust transmission can be achieved by using codes which can incrementally add FEC columns without limit. Thus, FEC data can be sent in plural bursts between application data bursts. A receiver receives the FEC bursts until it is capable of correcting all errors. This method provides strong coding and long interleaving.

Application data and FEC data can be clearly distinguished, thus making it easier to receive only the application data. This can be useful for receivers which are not equipped for FEC.

Also, the number of real time parameters may be reduced since parameters relating to FEC may be excluded from application data bursts. As will be explained in more detail later, the PID of the FEC data is signaled in an SI table.

As mentioned earlier, MAC_address_5 field may be used to indicate a burst number. An application data burst can be assigned a burst number and a corresponding FEC data burst can be assigned the same burst number. This allows a receiver to identify to which application data burst one or more FEC data burst corresponds. This has an advantage of allowing interleaving depth to be increased.

Figure 16:
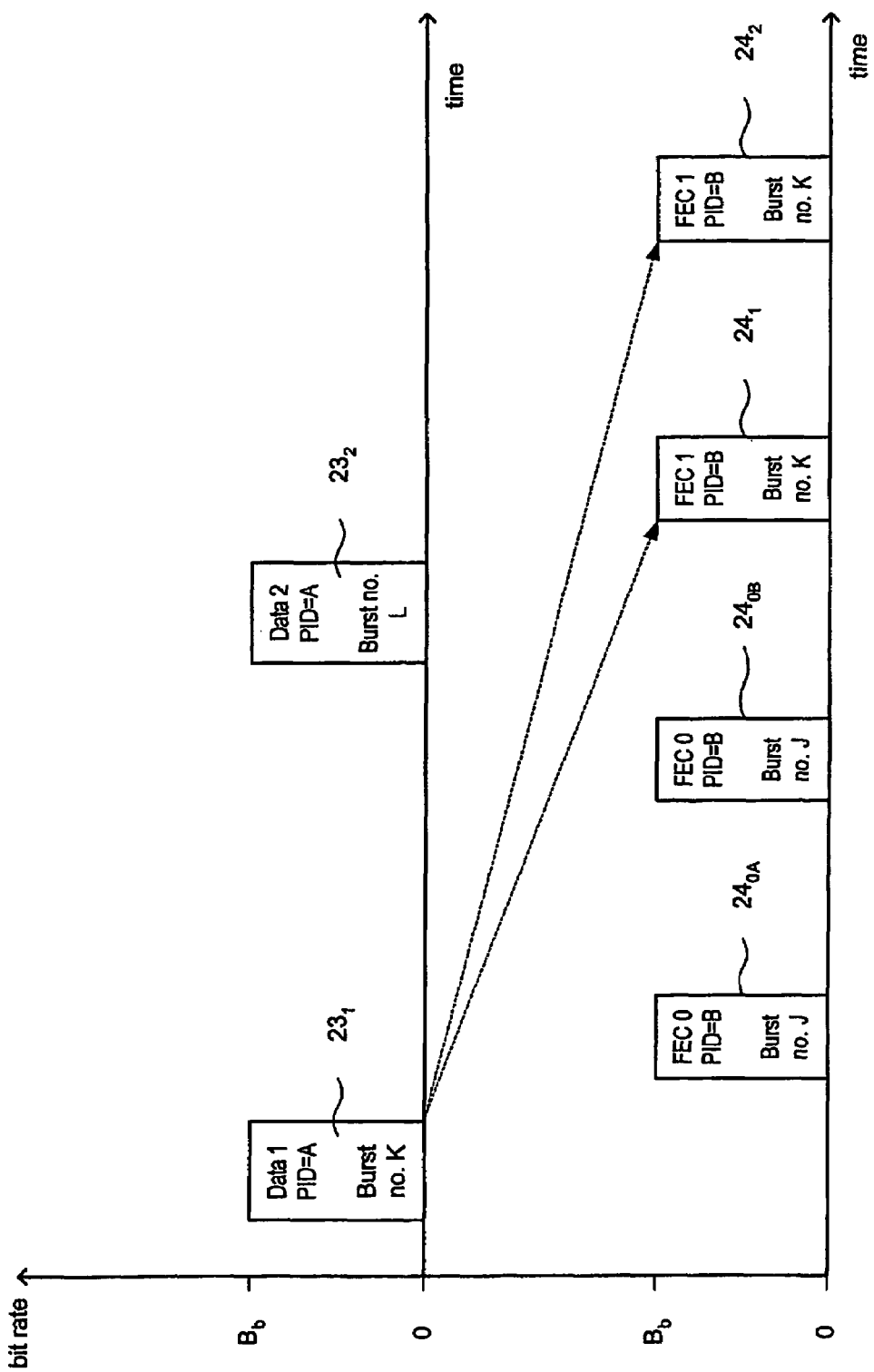
FIG. 16 shows transmission of application data bursts and FEC data bursts with variable interleaving length in accordance with one embodiment of the present invention

Referring to FIG. 16, the application burst $23_1$ having a burst number K may be transmitted followed by FEC bursts $24_{OA}$, $24_{OB}$ each having burst number J, associated with an earlier application burst (not shown). Application burst $23_2$ having burst number L can then be transmitted followed by FEC bursts $24_1$, $24_2$ having burst number K, associated with application burst $23_1$. Shorter or longer interleaving lengths may be used. It is noted that burst numbering can take into account that two or more FEC bursts may be carrying FEC data for one application data burst.

Thus, when an application burst is transmitted, one or more FEC bursts associated with the application burst can be transmitted immediately afterwards (before the next application burst) or later after plural application bursts.

Controlling Means 27

Referring to FIG. 4, the MPE encapsulator 6 receives, modifies and/or prepares PSI/SI and SI data 10 and transmits the data 10 to receivers.

The controlling means 27 generates an IP/MAC Notification Table (INT) (not shown). The INT is used to signal the PID of the TS packets $12_{A1}$ (FIG. 13) carrying application data $17_1$ (FIG. 6c). In other words, the INT is used to signal the availability and location of the elementary stream with PID=A.

The controlling means 27 segments the INT into sections (not shown) and passes the table sections to the encapsulating and multiplexing means 25 to be mapped into TS packets (not shown) having PID=0x004C and multiplexed into the transport stream 11 (FIG. 2).

The INT is described in more detail in Sections 7.6 of ETSI EN 301 192 "Digital Video Broadcasting (DVB); DVB specification for data broadcasting" V1.2.1 (2003-01).

As briefly mentioned earlier, a data broadcast descriptor in a Service Description Table (SDT) transmitted using service description sections indicates that MAC-_address 1 to MAC-_address 4 fields, and optionally MAC_address 5 filed, are not being used to differentiate receivers within an elementary stream but are being used to carry real time parameters, such as delta-t.

The service description sections and data broadcast descriptor is described in more detail in Sections 6 and 7 of ETSI EN 300 468 "Digital Video Broadcasting (DVB); Specification for Service Information (SI) in DVB systems" V1.5.1 (2003-01).

Figure 18:
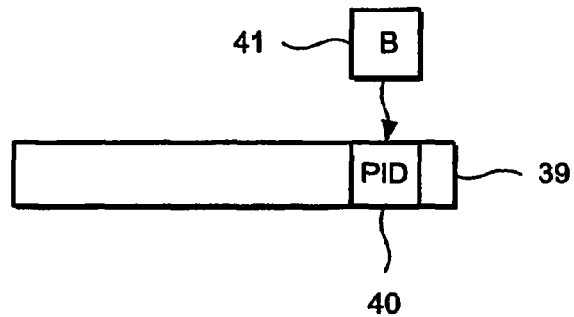
FIG. 18 shows specification of a PID in a time slice and FEC descriptor in accordance with one embodiment of the present invention.

Referring to FIG. 18, a time slice identifier descriptor 39 is shown. In one embodiment of the invention, the syntax of the time slice identifier descriptor 39 is given in Table 4 below:

TABLE 4

| Syntax | No. of bits | Identifier |
|---|---|---|
| Time_slice_fec_identifier_descriptor ( ){ | | |
|     descriptor_tag | 8 | uimsbf |
|     descriptor_length | 8 | uimsbf |
|     time_slicing | 1 | bslbf |
|     mpe_fec | 1 | uimsbf |
|     reserved_for_future use | 1 | uimsbf |
|     data_padding_columns | 8 | uimsbf |
|     max_burst_duration | 4 | uimsbf |
|     max_frame size | 4 | uimsbf |
|     mpe_fec PID | 13 | uimsbf |
| } | | |

According to Table 4 above, the descriptor_tag field is provided with a value agreed specified by a standards organization. The descriptor_length field specifies the number of bytes immediately following the field. The time_slicing field indicates, whether the elementary stream in question is time sliced. A value "1" indicates that time slicing is being used, while a value "0" indicates that time slicing is not used. The mpe_fec field indicates whether the elementary stream uses MPE-FEC.

The data_padding_columns field specifies the fixed number of padding columns $32_1$ (FIG. 6b) that are introduced immediately before the end of the application data table 31 (FIG. 6b). In one embodiment of the invention, the number of padding columns can take a value between 0 and 190. If the mpe_fec field is set to "0" then the content of the field is ignored.

The max_burst_duration field is used to indicate the maximum burst duration in the concerned elementary stream. A burst does not start before $T_1$ and does not end later than $T_2$, where $T_1$ is the time indicated by delta-t on a previous burst, and $T_2=T_1+$maximum burst duration. In one embodiment of the invention, the indicated value for maximum burst duration preferably lies within a range from 20 ms to 512 s in 20 ms steps. The maximum burst duration=max_burst_duration×20 milliseconds. In one embodiment of the invention, the max_burst_duration field may be encoded according to Table 5 below:

TABLE 5

| Duration | Description |
| --- | --- |
| 0000 | 100 ms |
| 0001 | 125 ms |
| 0010 | 150 ms |
| 0011 | 200 ms |
| 0100 | 250 ms |
| 0101 | 300 ms |
| 0110 | 350 ms |
| 0111 | 400 ms |
| 1000 | 500 ms |
| 1001 | 600 ms |
| 1010 | 800 ms |
| 1011 | 1100 ms |
| 1100 | 1500 ms |
| 1101 | 2000 ms |
| 1110 | 3000 ms |
| 1111 | 5000 ms |

The frame_size field is used to give information that a decoder may use to adapt its buffering usage. The exact interpretation depends on whether time slicing and/or MPE-FEC are used.

If the time_slicing field is set to "0", i.e. time slicing is not used, then the frame_size field is reserved for future use and is set to 0x00 when not used. If the time_slicing field is set to "1", i.e. time slicing is used, then the frame_size field indicates the maximum number of bits on section level allowed within a time slice burst on the elementary stream. Bits are calculated from the beginning of the table_id field to the end of the CRC_32 field.

If the mpe_fec field is set to "1", i.e. MPE-FEC is used, then the frame_size field indicates the exact number of rows on each MPE-FEC frame on the elementary stream. When both time slicing and MPE-FEC are used on the elementary stream, both limitations (i.e. the maximum burst size and the number of rows) apply. In one embodiment of the invention, Frame_size field may be coded according to Table 6 below:

TABLE 6

| Size | Max Burst size | MPE-FEC frame rows |
| --- | --- | --- |
| 0x00 | 128 kbits | 64 |
| 0x01 | 256 kbits | 128 |
| 0x02 | 384 kbits | 192 |
| 0x03 | 512 kbits | 256 |
| 0x04 | 640 kbits | 320 |
| 0x05 | 768 kbits | 384 |
| 0x06 | 896 kbits | 448 |
| 0x07 | 1024 kbits | 512 |
| 0x08 | 1152 kbits | 576 |
| 0x09 | 1280 kbits | 640 |
| 0x0A | 1408 kbits | 704 |
| 0x0B | 1536 kbits | 768 |
| 0x0C | 1664 kbits | 832 |
| 0x0D | 1792 kbits | 896 |
| 0x0E | 1920 kbits | 960 |
| 0x0F | 2048 kbits | 1024 |
| 0x10 to 0x1F | Reserved for future use | Reserved for future use |

If the max_frame_size field indicates "reserved_for_future_use", the receiver assumes that the maximum burst size is greater than 2 Mbits and MPE-FEC frame rows more than 1024.

In one embodiment of the invention, time slicing is not used, i.e. MPE-FEC frames are transmitted without any time slicing. A field that supports a cyclic MPE-FEC frame index within the elementary stream can be used for control purposes. The value of the field increases by one for each subsequent MPE-FEC frame. After value "111111111111", the field restarts from "000000000000".

The mpe_fec PID field 40 specifies the PID of the elementary stream used to transmit FEC data $18_1$, $18_2$, $18_q$ of the elementary stream in question. Thus, for elementary stream with PID=A, the field 40 is filled with a value 41, namely PID=B.

Figure 19:
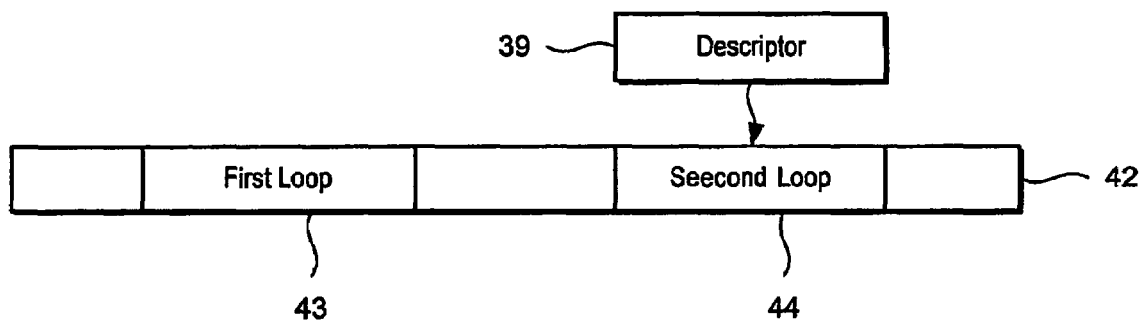
FIG. 19 illustrates inclusion of the time slice and FEC descriptor of FIG. 18 into a Network Interface Table.

Referring to FIG. 19, the time slice identifier descriptor 39 is used in a Network Information Table (NIT) 42 (step S12). In one embodiment of the invention, the syntax of the NIT 42 is shown in Table 7 below:

TABLE 7

| Syntax | No. of bits | Identifier |
| --- | --- | --- |
| network_information_section( ){ | | |
|   table_id | 8 | uimsbf |
|   section_syntax_indicator | 1 | bslbf |
|   reserved_future_use | 1 | bslbf |
|   Reserved | 2 | bslbf |
|   section_length | 12 | uimsbf |
|   network_id | 16 | uimsbf |
|   Reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   network_descriptors_length | 12 | uimsbf |
|   for(i=0;i<N;i++){ | | |
|     descriptor( ) | | |
|   } | | |
|   reserved_future_use | 4 | bslbf |
|   transport_stream_loop_length | 12 | uimsbf |
|   for(i=0;i<N;i++){ | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for(j=0;j<N;j++){ | | |
|       descriptor( ) | | |
|     } | | |

TABLE 7-continued

| Syntax | No. of bits | Identifier |
|---|---|---|
| } | | |
| CRC_32 | 32 | rpchof |
| } | | |

When located in a first descriptor loop 43, the descriptor 39 applies to all transport streams announced within the table. The descriptor 39 applies to all elementary streams having a given stream_type field value on any of the transport streams. In one embodiment of the present invention, a stream_type field value of 0x0D is used for elementary streams carrying MPE only streams. A stream_type field value of 0x80 may be used for elementary streams carrying MPE and FEC sections. A stream_type field value of between 0x80 and 0xFF may be used for elementary streams carrying only EEC section.

When located in a second descriptor loop 44, the descriptor 39 applies to the transport stream in question, specified by the transport_stream field. The descriptor applies to all elementary streams having a given stream_type field value. This descriptor 39 overwrites possible descriptors in the first descriptor loop.

In other embodiments of the invention the descriptor 39 may be included in other types of tables, such as in an INT.

When located in the platform descriptor loop, the descriptor applies to all elementary streams referred to within the table. This descriptor overwrites possible descriptors in NIT.

When located in the target descriptor loop, the descriptor applies to all elementary streams referred within the target descriptor loop in question after the appearance of the descriptor. This descriptor overwrites possible descriptors in the platform descriptor loop and in NIT. In case an elementary stream is referred from multiple locations within an INT, each contains the same signaling.

The controlling means 27 generates the NIT 42 including the descriptor 39 in the second descriptor loop 44 indicating PID=B in the mpe_fec PID field 40 (step S12).

Figure 20:
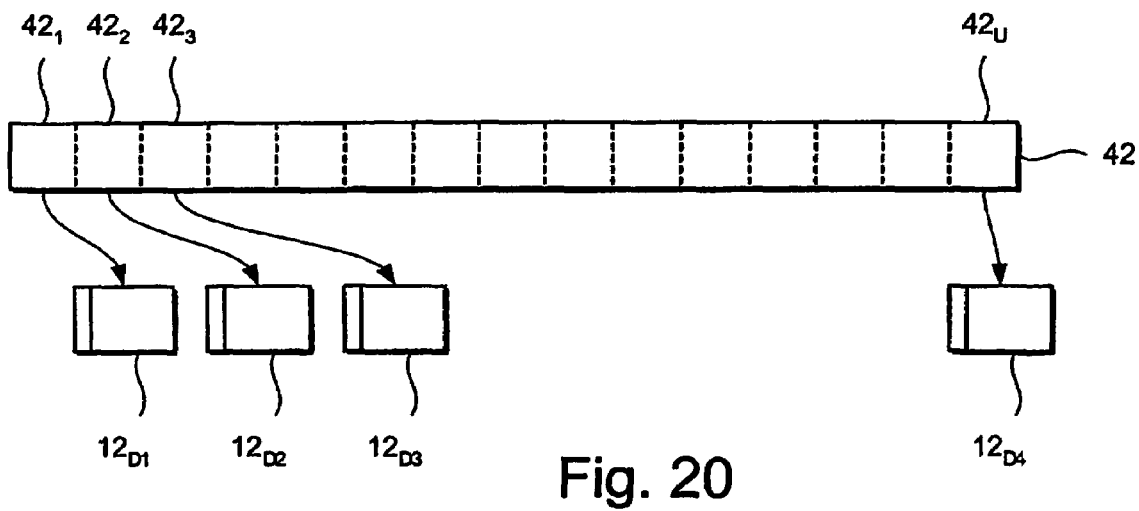
FIG. 20 illustrates segmentation of the Network Interface Table shown in FIG. 19 and mapping into transport stream packets in accordance with the present invention.
Figure 21:
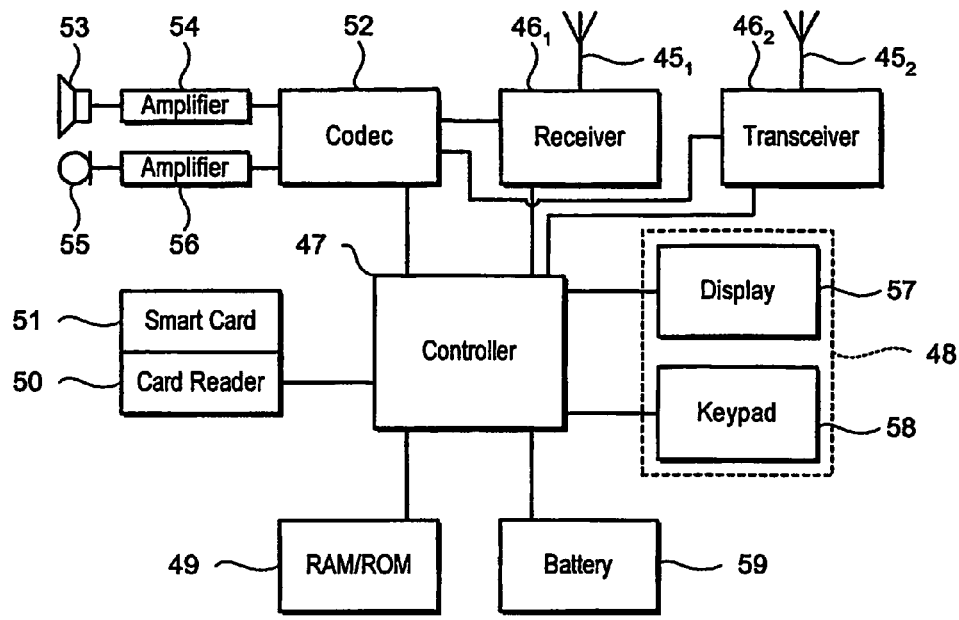
FIG. 21 is a schematic diagram of a mobile telephone handset in accordance with the present invention.

Referring to FIG. 20, the controlling means 27 segments the NIT 42 into table sections $42_1$, $42_2$, $42_3$, $42_U$ (step S13) and maps them into TS packets $12_{D1}$, $12_{D2}$, $12_{D3}$, $12_{DU}$, labeled in this case with PID=0x0010 and multiplexes the TS packets $12_{D1}$, $12_{D2}$, $12_{D3}$, $12_{DU}$ into the transport stream 11 (FIG. 2) (step S14).

A receiver usually only accesses the NIT 42 when connecting to the network 1 (FIG. 1).

A receiver may need to read the content of an INT when changing from one transport stream 11 to another (not shown) and usually not more than once. Changes in the INT can be signaled in PSI using a PMT table (not shown), thus ensuring that constant filtering of the INT is not required.

PSI tables, such as the INT (not shown) and NIT 42, are usually re-transmitted at least once in every 100 ms. If the duration of a burst is longer than 100 ms, a receiver has access to all PSI tables while receiving a burst. For shorter bursts, a receiver may choose to keep switched on until all required PSI tables are received.

Mobile Terminal 2

Referring to FIG. 20, mobile terminal 2 is preferably in the form of a mobile telephone handset with a multimedia capability.

The mobile terminal 2 includes first and second antennae $45_1$, $45_2$, a receiver $46_1$ and a transceiver $46_2$. In this example, the first antenna $45_1$ and receiver $46_1$ are used to receive signals from the communications network 1 (FIG. 1), in this case a DVB-T network. The second antenna $45_2$ and transceiver $46_2$ are used to transmit and receive signals to and from a second communications network, such as a PLMN (not shown). The receiver and transceiver $45_1$, $46_2$ each include respective r.f. signal processing circuits (not shown) for amplifying and demodulating received signals and respective processors (not shown) for channel decoding and demultiplexing.

The mobile terminal 2 also includes a controller 47, a user interface 48, memory 49, a smart card reader 50, smart card 51 received in the smart card reader 50, a coder/decoder (codec) 52, a speaker 53 with corresponding amplifier 54 and a microphone 55 with a corresponding pre-amplifier 56.

The user interface 48 comprises a display 57 and a keypad 58. The display 57 is adapted for displaying images and video by, for instance, being larger and/or having greater resolution than a display of conventional mobile telephone and being capable of color images. The mobile terminal 2 also includes a battery 59.

The controller 47 manages operation of the mobile terminal 2 under the direction of computer software (not shown) stored in memory 49. For example, the controller 47 provides an output for the display 57 and receives inputs from the keypad 58.

The mobile terminal 2 may be modified providing a single receiver adapted to receive signals from the first communications network 1 (FIG. 1) and the second communications network (not shown) and a transmitter adapted to transmit signals to the second communications network (not shown). Alternatively, a single transceiver for both communications networks may be provided.

Figure 22:
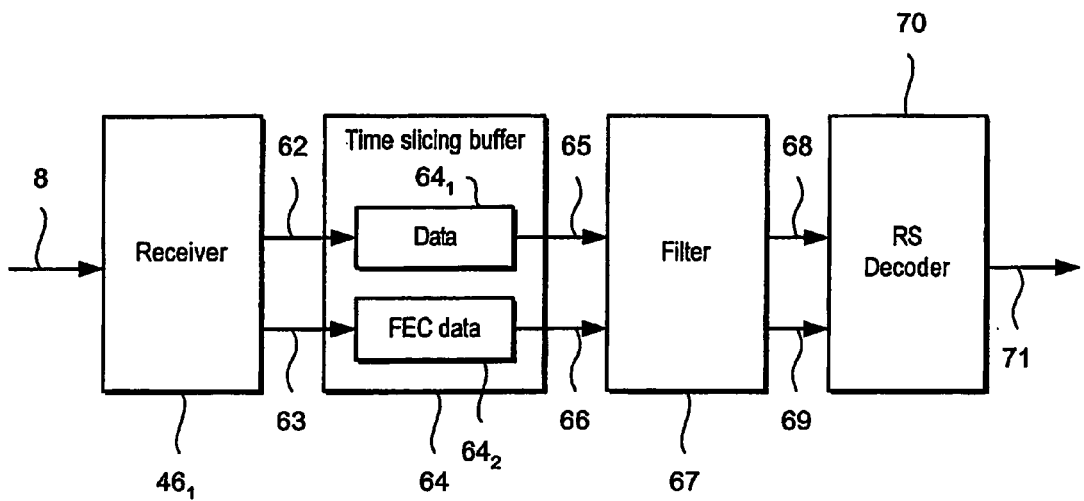
FIG. 22 shows functional elements of the mobile telephone handset of FIG. 21 for receiving and processing time-sliced bursts.

Referring to FIG. 22, the receiver $46_1$ is intermittently switched on to receive the signal 8 from the first communications network 1. The signal 8 is amplified, demodulated, channel decoded and demultiplexed into first and second elementary streams 62, 63.

The first elementary stream 62 includes TS packets $12_{A1}$, $12_{A2}$, $12_{A3}$, $12_{A4}$, $12_{A5}$, $12_{A6}$, $12_{AS}$ (FIG. 13) carrying application data bursts $23_1$, $23_2$ (FIG. 12). The second elementary stream 63 includes $12_{B1}$, $12_{B2}$, $12_{B3}$, $12_{B4}$, $12_{B5}$, $12_{B6}$, $12_{BT}$ (FIG. 14) carrying FEC data bursts $24_1$, $24_2$, $24_3$ (FIG. 12).

The first and second elementary streams 62, 63 are fed into buffering means 64 comprising a first portion $64_1$ for buffering application data bursts $23_1$, $23_2$ ( FIG. 12) and a second portion $64_2$ for buffering FEC data bursts $24_1$, $24_2$, $24_3$ (FIG. 12). The buffering means 64 is provided by controller 47 and memory 49. The buffering means 64 outputs first and second streams 65, 66 of sections which are not time sliced. Preferably, the streams 65, 66 are substantially continuous and/or at a substantially constant rate.

The streams 65, 66 are fed into a filtering means 67 which extracts data packets from sections and outputs corresponding streams 68, 69 of data packets.

The first data packet stream 68 ideally comprises application data packets $17_1$, $17_2$, $17_3$, $17_4$, $17_m$, $17_n$ (FIG. 6c). The second data packet stream 69 ideally comprises FEC data packets $18_1$, $18_2$, $18_q$ (FIG. 6c). However, errors may have been introduced during transmission.

The streams 68, 69 are fed into a decoder 70 for performing forward error correction and outputting a stream of data packets 71. In this example, the decoder 70 is a Reed-Solomon decoder.

Referring to also FIG. 23, an example of a method of operating the mobile terminal 2 will now be described in more detail:

When the mobile terminal is switched on by the user, the controller 47 downloads the received, inter alia, NIT 42 and INT (not shown) and stores them in memory 49 (steps S15 & S16). The controller 47 downloads other tables, such as PMT and PAT. The tables may have been downloaded at other times and may be downloaded repeatedly.

The user selects a service, such as streaming video (step S17). The controller 47 looks up the PID for the service in the INT (not shown).

The controller 47 examines the NIT 42 or other received tables to determine whether time slicing has been enabled for the service (step S18). In another embodiment of the invention the enablement of time-slicing may be announced, for example in NIT. If time slicing is not used, then the controller 47 receives and processes data which is not time-sliced in a conventional manner (step S19).

Otherwise, the controller 47 determines whether to use forward error correction (step S20). The determination may be based on e.g. BER (bit error rate) or on received signal strength or on user decision.

If so, the controller 47 begins to listen for application bursts 23 comprised in TS packets with PID=A (step S21). Preferably, the receiver $46_1$ remains switched on until it receives at least part of an application burst 23 and thus obtains a value of delta-$t_A$.

Figure 17:
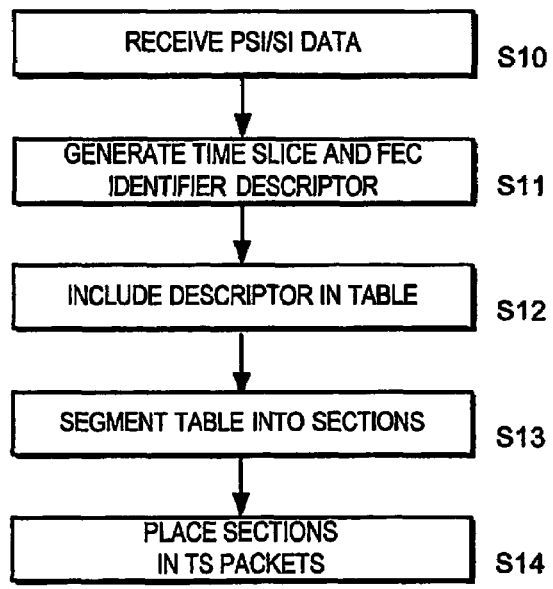
FIG. 17 is a process flow diagram of a second process performed by the MPE encapsulator shown in FIG. 4 in one embodiment of the present invention.

The controller 47 examines mpe_fec PID field 40 (FIG. 17) of descriptor 39 (FIG. 18) of the received INT and PMT and begins to listen for FEC bursts 24 comprised in TS packets with PID=B (step S22). Preferably, the receiver $46_1$ remains switched on until it receives at least part of an FEC burst 24 and thus obtain a value of delta-$t_B$.

If no other service is required, the controller 47 instructs the receiver $46_1$ to switch off (step S23).

Based upon a value of delta-$t_A$, the controller 47 instructs the receiver $46_1$ to switch on when the next application burst 23 expected, receive the application burst 23 and switch off (step S24). This is repeated for N times. Receiving the application burst 23 includes demodulating, decoding and demultiplexing the signal 8 and buffering the application burst 23 in buffering means 64.

Based upon a value of delta-$t_B$, the controller 47 instructs the receiver $46_1$ to switch on when the next FEC burst 24 expected, receive the FEC burst 24 and switch off (step S25). This is repeated for M times. Receiving the FEC burst 24 includes demodulating, decoding and demultiplexing the signal 8 and buffering the FEC burst 23 in buffering means 64. This controller 47 may instruct the receiver $46_1$ to switch on and off repeatedly so as to receive plural FEC bursts 24 before switching on again to receive an application burst 23. In order to save power, the PEC bursts may be received only if there is an error detected in the application data burst.

If service is still required (step S26), then the controller 47 continues to instruct the receiver $46_1$ to switch on and off intermittently to receive interleaved application and FEC bursts 23, 24.

If forward error correction is not required, for example through user choice or because decoder 70 is not provided, the controller 47 instructs the receiver $46_1$ to listen for application bursts 23 comprised in TS packets with PID=A (step S 27). Once the controller 47 obtains a value of delta-$t_A$ it instructs the receiver $46_1$ to switch off and thereafter to switch on when the next application burst 23 expected, receive the application burst 23 and switch off (step S29).

As explained earlier, each MPE section 20 includes a value of delta-$t_A$. The later an MPE section 20 is found in an application burst 23, the smaller the value of delta-$t_A$. Therefore, the controller 47 may repeatedly extract a value of delta-$t_A$ from each MPE section 20 and update a value stored in memory 49. Preferably, the processor extracts a value of delta-$t_A$ from the last MPE section $20_n$ (FIG. 10) of an application burst $23_1$ and stores the value in memory 49. The value of stored in memory 49 is used to determine when the first TS packet 12 comprising application data of the next burst $23_2$ will be received.

Likewise, the controller 47 may repeatedly extract a value of delta-$t_B$ from each FEC section 21 and update a value stored in memory 49. Preferably, the controller 47 extracts a value of delta-$t_B$ from the last FEC section $21_q$ (FIG. 11) of an FEC burst $24_1$ and stores the value in memory 49.

It will be appreciated that many modifications may be made to the embodiments hereinbefore described. For example, the mobile terminal may be a personal data assistant (PDA) or other mobile terminal capable of at least of receiving signals via the first communications network 1. The mobile terminal may also be semi-fixed or semi-portable such as a terminal carried in vehicle, such as a car.

The invention claimed is:

1. A method comprising:
providing data for transmission;
providing forward error correction data for said data;
forming a first set of bursts comprising transmission data; and
forming a second set of bursts comprising forward error correction data.

2. A method according to claim 1, comprising:
transmitting said first set of bursts via a first channel, and
transmitting said second set of bursts via a second, different channel.

3. A method according to claim 1, comprising:
providing a first parameter for indicating a timing offset between a first, earlier burst comprising at least some of said transmission data and a second, later burst comprising further transmission data;
providing a second parameter for indicating a timing offset between a third, earlier burst comprising at least some of said forward error correction data and a fourth, later burst comprising further forward error correction data;
forming said first burst including said first timing parameter and
forming said third burst including said second timing parameter.

4. A method according to claim 3, wherein:
said at least some of said transmission data comprises some of said transmission data; and
said further transmission data comprises some more of said transmission data.

5. A method according to claim 3, wherein:
said at least some of said transmission data comprises all of said transmission data; and
said further transmission data comprises additionally provided transmission data.

6. A method according to claim 3, comprising:
said at least some of said forward error correction data comprises some of said forward error correction data; and
said further forward error correction data comprises some more of said forward error correction data.

7. A method according to claim 3, comprising:
said at least some of said forward error correction data comprises all of said forward error correction data; and
said further forward error correction data comprises some additionally provided forward error correction data.

8. A method according to claim 3, comprising:
dividing said first burst between a first set of packets;
identifying each of said first set of packets with a first identity;

dividing said third burst between a second set of packets; and identifying each of said second set of packets with a second identity.

9. A method according to claim 8, wherein said first and second identities are the same.

10. A method according to claim 3, comprising:
dividing said second burst between a third set of packets; wherein providing said first timing parameter comprises:
specifying a time until a start of a first one of said third set of packets.

11. A method according to claim 3, comprising:
dividing said fourth burst between a fourth set of packets; wherein providing said second timing parameter comprises:
specifying a time until a start of a first one of said fourth set of packets.

12. A method according to claim 3, comprising:
preparing service information; and
including said second identify in said service information.

13. A method according to claim 12, comprising:
including said second identity in a descriptor; and
including said descriptor in a table forming part of said service information.

14. A method according to claim 3, wherein said transmission data comprises a plurality of data packets, and said method comprises:
placing at least some of data packets in respective ones of a first set of sections.

15. A method according to claim 14, comprising:
including said first timing parameter in at least one of said first set of sections.

16. A method according to claim 14, comprising:
calculating a timing parameter for each section based on said first timing parameter and
including a respective timing parameter in each of said first set of sections.

17. A method according to claim 3, wherein said forward error correction data comprises a plurality of data packets, and said method comprises:
placing at least some of data packets in respective ones of a second set of sections.

18. A method according to claim 17, comprising:
including said second timing parameter in at least one of said second set of sections.

19. A method according to claim 17, comprising:
calculating a timing parameter for each section based on said second timing parameter and
including a respective timing parameter in each one of said second set of sections.

20. A method according to claim 1, comprising:
providing a first parameter for identifying a burst comprising at least some of said transmission data;
providing a second parameter for identifying at least one burst comprising forward error correction associated with said at least some of said transmission data;
forming a first burst including said first identifying parameter and
forming a second burst including said second identifying parameter.

21. A method according to claim 1, comprising:
labeling at least one burst of said first set of bursts with an identifier; and
labeling at least one burst of said second set of bursts with a corresponding identifier.

22. A method according to claim 1, wherein transmitting data is internet protocol datacasting over a digital broadcasting network.

23. A computer readable medium storing a computer program comprising computer program instructions for causing processor
to provide data for transmission:
to provide forward error correction data for said data:
to form a first set of bursts comprising transmission data: and
to form a second set of bursts comprising forward error correction data.

24. A system comprising:
providing data for transmission;
providing forward error correction forward error correction data for said data;
forming a first set of bursts comprising transmission data; and
forming a second set of bursts comprising forward error correction data.

25. Apparatus, comprising a processor configured:
to provide data for transmission;
to provide forward error correction data for said data;
to form a first set of bursts comprising transmission data; and
to form a second set of bursts comprising forward error correction data.

26. Apparatus, comprising:
an input for providing data for transmission;
a processor for providing forward error correction data for said data;
a processor for forming a first set of bursts comprising transmission data and
a processor for forming a second set of bursts comprising forward error correction data.

27. Apparatus, comprising a processor configured:
to receive a first set of bursts comprising transmission data and
to receive a second set of bursts comprising forward error correction data for said transmission data.

* * * * *